(12) United States Patent
Chen et al.

(10) Patent No.: US 9,832,807 B2
(45) Date of Patent: Nov. 28, 2017

(54) METHOD AND DEVICE FOR MODE SWITCHING

(71) Applicant: ZTE Corporation, Shenzhen (CN)

(72) Inventors: Lin Chen, Shenzhen (CN); Shuyu Ma, Shenzhen (CN); Yumin Luo, Shenzhen (CN); Ying Huang, Shenzhen (CN); Yulan Liu, Shenzhen (CN); Feng Xie, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 14/901,024

(22) PCT Filed: Jun. 25, 2014

(86) PCT No.: PCT/CN2014/080763
§ 371 (c)(1),
(2) Date: Dec. 27, 2015

(87) PCT Pub. No.: WO2014/206302
PCT Pub. Date: Dec. 31, 2014

(65) Prior Publication Data
US 2016/0374139 A1    Dec. 22, 2016

(30) Foreign Application Priority Data
Jun. 27, 2013   (CN) .......................... 2013 1 0263247

(51) Int. Cl.
*H04W 76/04*   (2009.01)
*H04L 12/801*   (2013.01)
(Continued)

(52) U.S. Cl.
CPC .......... *H04W 76/043* (2013.01); *H04L 47/29* (2013.01); *H04W 24/02* (2013.01);
(Continued)

(58) Field of Classification Search
CPC combination set(s) only.
See application file for complete search history.

(56) References Cited

U.S. PATENT DOCUMENTS 9,369,878 B2 * 6/2016 Zhang ................. H04W 76/025
9,497,798 B2 * 11/2016 Kazmi ................. H04W 88/06
(Continued)

FOREIGN PATENT DOCUMENTS

| CN | 1549613 A | 11/2004 |
|----|-----------|---------|
| CN | 102932751 A | 2/2013 |

(Continued)

OTHER PUBLICATIONS

International Search Report for corresponding application PCT/CN2014/080763 filed Jun. 25, 2014; dated Sep. 30, 2014.
(Continued)

*Primary Examiner* — Michael T Vu
(74) *Attorney, Agent, or Firm* — Cantor Colburn LLP

(57) ABSTRACT

A method and device for mode switching includes: a first base station sending a message including mode switching information to a first User Equipment (UE) to trigger the first UE to perform mode switching according to indication information of a mode in the mode switching information. The problem of poorer service continuity caused by mode switching inflexibility in the related is solved, and the effect of improving overall throughput of a system is further achieved.

28 Claims, 16 Drawing Sheets

A first UE receives a message including mode switching information from a first base station — S202

The first UE performs mode switching according to the indication information of the mode carried in the mode switching information — S204

(51) Int. Cl.
    *H04W 24/02*     (2009.01)
    *H04W 28/02*     (2009.01)
    *H04W 88/06*     (2009.01)
    *H04W 72/12*     (2009.01)
    *H04W 84/04*     (2009.01)
    *H04W 88/16*     (2009.01)

(52) U.S. Cl.
    CPC .... *H04W 28/0268* (2013.01); *H04W 72/1215* (2013.01); *H04W 84/042* (2013.01); *H04W 88/06* (2013.01); *H04W 88/16* (2013.01)

(56) References Cited

U.S. PATENT DOCUMENTS

| | | | |
|---|---|---|---|
| 2010/0279672 A1* | 11/2010 | Koskela | H04W 36/30 455/418 |
| 2011/0244899 A1 | 10/2011 | Li et al. | |
| 2011/0255409 A1* | 10/2011 | Aramoto | H04W 36/0027 370/236 |

FOREIGN PATENT DOCUMENTS

| | | | |
|---|---|---|---|
| CN | 102984699 A | 3/2013 | |
| WO | 2012048464 A1 | 4/2012 | |
| WO | 2013012241 A1 | 1/2013 | |
| WO | 2013044864 | 4/2013 | |

OTHER PUBLICATIONS

International Search Report for corresponding application EP14816825; dated May 16, 2016; pp. 9.

\* cited by examiner

METHOD AND DEVICE FOR MODE SWITCHING

TECHNICAL FIELD

The disclosure relates to the communications field and in particular to a method and device for mode switching.

BACKGROUND

Along with development of wireless multimedia services, requirements of people on high data rate and user experiences increasingly grow, so that higher requirements on system capacity and coverage of a conventional cellular network are made. On the other hand, requirements of people on knowing about interested persons or things nearby and proximity service gradually increase along with prevailing of applications such as a social network, short-distance data sharing and local advertising. A conventional Evolved NodeB (eNB)-centred cellular network has obvious limitations in terms of supporting to high data rate and proximity service, and in such a requirement background, a Device-to-Device (D2D) technology representative of a new direction of future development of communication technologies emerges. Application of a D2D technology may reduce a burden of a cellular network, reduce battery power consumption of a User Equipment (UE), increase data rate, improve robustness of a network infrastructure and well meet requirements on a high-data rate service and proximity service.

The D2D technology may work in an authorized frequency band or an unauthorized frequency band, and allows direct discovery/direct communication of multiple of UEs supporting a D2D function (i.e. D2D UEs) with a network infrastructure or without a network infrastructure. The D2D technology usually includes a D2D discovery technology and a D2D communication technology: the D2D discovery technology refers to a technology configured to judge/determine proximity between two or more D2D UEs (for example, within a range where D2D direct communication is allowed) or configured to judge/determine that a first UE is proximal to a second UE. Usually, the two or more D2D UEs may discover each other by sending or receiving discovery signals/information, and in a coverage of a cellular network, the cellular network may assist a D2D UE in D2D discovery; and the D2D communication technology refers to a technology configured to realize direct communication of a part or all of communication data between D2D UEs without a network infrastructure.

Mutual discovery and communication between UEs supporting a D2D function are not constant, but change along with relative movement of the UEs. As shown in FIG. 1, in a scenario with a coverage of a network infrastructure, data session communication is established between a UE1 and a UE2 supporting a D2D function, and a data stream is forwarded through a infrastructure of a cellular network. Along with gradual movement of the UE1 to a surrounding area of the UE2, the UE1 gradually gets close enough to the UE2 to support D2D discovery and D2D communication. In such a scenario, the data stream between the UE1 and the UE2 may be switched from a cellular communication mode into a D2D communication mode, thereby enjoying advantages of high rate, low delay, energy saving and the like of D2D communication. On the contrary, in a D2D communication process of the UE1 and the UE2, when the UE1 continues moving and gradually gets far away from the UE2, a data session between the UE1 and the UE2 is required to be switched from the D2D communication mode back into the cellular communication mode when a D2D communication link is unavailable. No matter switching from the cellular communication mode to the D2D communication mode or switching from the D2D communication mode to the cellular communication mode, a system requires to avoid users perceiving mode switching in a process of mode switching under a control of a network infrastructure, thereby ensuring service continuity.

From the above, inflexible mode switching in the related art may cause poorer service continuity.

SUMMARY

The embodiments of the disclosure provide a method and device for mode switching, so as at least to solve above-mentioned problem.

According to one aspect of the disclosure, a method for mode switching is provided, which includes: a first base station sends a message including mode switching information to a first UE to trigger the first UE to perform mode switching according to indication information of a mode carried in the mode switching information.

In an example embodiment, before the first base station sends the message including the mode switching information to the first UE, the method further includes:

the first base station determines that the first UE meets a condition of the mode switching, wherein the first base station is a serving base station of the first UE.

In an example embodiment, the first base station determines that the first UE meets the condition of the mode switching or not includes:

the first base station sends a first mode switching request to a Mobility Management Entity (MME) or a D2D server; and the first base station receives a first mode switching response message sent by the MME or ProSe function, wherein the first mode switching response message is used for indicating that the first UE meets the condition of the mode switching; or the first base station receives a message which is sent, by the MME or the ProSe function, to the first base station and used for indicating the first UE to perform the mode switching.

In an example embodiment, the first base station, the MME or the ProSe function determines that the first UE meets the condition of the mode switching includes:

when the following conditions are met, the first UE is determined to meet a condition of switching from a cellular communication mode to a D2D communication mode:

the first UE supports a D2D communication function or passes D2D communication authorization and authentication, cellular communication is performed between the first UE and the second UE, the first UE is in a proximity with the second UE, and there are enough D2D communication air interface resources for D2D communication between the first UE and the second UE;

when one of the following conditions is met, the first UE is determined to meet a condition of switching from the D2D communication mode to the cellular communication mode:

D2D communication is performed between the first UE and the second UE, and there are enough cellular communication air interface and backhaul link resources;

D2D communication is performed between the first UE and the second UE, the first UE is not in the proximity with the second UE, and there are enough cellular communication air interface and backbone link resources;

wherein, the second UE refers to one of the followings: a UE which has established cellular communication with the first UE and a UE which has established D2D communication with the first UE.

In an example embodiment, the first base station judges whether the first UE is in the proximity with the second UE or not includes:

the first base station configures signal measurement to be performed by the first UE over the second UE, judges whether a D2D communication link quality threshold is met or not according to a measurement report sent by the first UE, determines that the first UE is in the proximity with the second UE when the D2D communication link quality threshold is met, or determines that the first UE is not in the proximity with the second UE when the D2D communication link quality threshold is not met; or the first base station judges whether a D2D communication link quality threshold is met or not according to a signal measurement result, obtained by the first UE, of the second UE carried in a received message, sent by the first UE, including first mode switching request information, determines that the first UE is in the proximity with the second UE when the D2D communication link quality threshold is met, or determines that the first UE is not in the proximity with the second UE when the D2D communication link quality threshold is not met; or the first base station acquires information about whether the first UE is in the proximity with the second UE or not from a network side entity, judges whether a distance between the first UE and the second UE meets a D2D communication distance threshold or not, determines that the first UE is in the proximity with the second UE when the distance meets the D2D communication distance threshold, or determines that the first UE is not in the proximity with the second UE when the distance does not meet the D2D communication distance threshold; or the first base station acquires geographical location information or distance information of the first UE and the second UE from a network side entity, judges whether a distance between the first UE and the second UE meets a D2D communication distance threshold or not, determines that the first UE is in the proximity with the second UE when the distance meets the D2D communication distance threshold, or determines that the first UE is not in the proximity with the second UE when the distance does not meet the D2D communication distance threshold;

wherein, when the first UE is in the proximity with the second UE, the first base station determines that the first UE and the second UE are qualified to perform D2D communication; or when the first UE is not in the proximity with the second UE, the first base station determines that the first UE and the second UE are able to perform cellular communication only.

In an example embodiment, the message including the first mode switching request information includes at least one of the followings:

an identifier of the second UE, a signal measurement result, obtained by the first UE, of the second UE, a signal measurement result, obtained by the first UE, of the first base station, an indication indicating which one of cellular communication and D2D communication is being conducted between the first UE and the second UE, bearer information corresponding to a data stream of the cellular communication or the D2D communication between the first UE and the second UE, quality of service information corresponding to data stream and/or bearer of the cellular communication or the D2D communication between the first UE and the second UE and an indication about whether the D2D communication data bearer has been established between the first UE and the second UE or not and/or data bearer of the D2D communication is required to be established between the first UE and the second UE.

In an example embodiment, the network side entity includes one of the followings: a packet data gateway serving the UE, a Serving GateWay (SGW), an MME, a ProSe function, a location information server and an entity with a UE discovery and detection function.

In an example embodiment, the step that the first base station judges whether there are enough D2D communication air interface resources for the D2D communication between the first UE and the second UE or not includes:

the first base station judges whether there are enough D2D communication resources supporting corresponding D2D communication or not according to the bearer information corresponding to data stream of the cellular communication between the first UE and the second UE and quality of service information corresponding to data stream and/or bearer of the cellular communication between the first UE and the second UE; and when a judgment result indicates that there are enough D2D air interface resources supporting the data stream of the cellular communication between the first UE and the second UE, the first base station determines that there are enough D2D communication air interface resources for the D2D communication between the first UE and the second UE.

In an example embodiment, the step that the first base station judges whether there are enough cellular communication air interface and backbone link resources or not includes:

the first base station judges whether there are enough cellular communication air interface and backbone link resources supporting corresponding cellular communication or not according to bearer information corresponding to data stream of the D2D communication between the first UE and the second UE and the quality of service information corresponding to data stream and/or bearer of the D2D communication between the first UE and the second UE;

wherein, when there are enough cellular communication air interface and backbone link resources supporting the data stream and/or bearer of the D2D communication between the first UE and the second UE, the first base station determines that there are enough cellular communication air interface and backbone link resources for the cellular communication between the first UE and the second UE.

In an example embodiment, the first base station triggers the first UE to perform the mode switching includes:

the first base station determines a second base station, and the second base station judges whether a second UE meets a condition of the mode switching or not, wherein, when the first base station is different from the second base station, the first base station initiates mode switching negotiation with the second base station to confirm whether the second UE meets the condition of the mode switching or not; and when the second base station determines that the second UE meets the condition of the mode switching, the first base station and the second base station send messages including the mode switching information to require the first UE and the second UE to execute mode switching.

In an example embodiment, the method further includes: when the first base station determines that the first UE does not meet the condition of the mode switching the first base station sends a message including mode switching reject information; or, the first base station receives a mode switching refusing message sent by the first UE, wherein the mode switching refusing message includes refusing reason indication information.

In an example embodiment, the step that the first base station initiates mode switching negotiation with the second base station includes:

the first base station sends a message including mode switching negotiation request information to the second base station;

the second base station receives the message including the mode switching negotiation request information, and judges whether the second UE meets the condition of the mode switching or not;

when the second UE meets the condition of the mode switching, the second base station sends a message including mode switching negotiation request confirmation information to the first base station, or when the second UE does not meet the condition of the mode switching, the second base station sends a message including mode switching negotiation failure information to the first base station, the mode switching negotiation failure information containing a failure reason indication; and when the first base station receives the message including the mode switching negotiation request confirmation information, the first base station determines that the mode switching negotiation succeeds; or after sending the message including the mode switching negotiation request information to the second base station, the first base station sends a message including mode switching negotiation cancellation information to the second base station to cancel the mode switching negotiation which is being performed.

In an example embodiment, the message including the mode switching negotiation request information carries at least one of the followings: an identifier of the first UE, an identifier of the second UE, the bearer information corresponding to the cellular communication/D2D communication data stream supported by the first base station between the first UE and the second UE, the quality of service information corresponding to the cellular communication/ D2D communication data stream and/or bearer supported by the first base station between the first UE and the second UE, the indication about whether the corresponding D2D communication/cellular communication bearer has been established between the first UE and the second UE or not and/or an indication indicating that D2D communication/cellular communication bearer is required to be established between the first UE and the second UE, a D2D communication resource mode configured for the first UE by the first base station and D2D capability information of the first UE; and the message including the mode switching negotiation request information may explicitly include one or more mode switching types.

In an example embodiment, before the first base station, the MME or the ProSe function judges whether the first UE meets the condition of the mode switching or not, the method further includes:

when the mode switching refers to switching from the cellular communication mode to the D2D communication mode, the first base station, the MME or the ProSe function acquires mode tendency information, which indicates that the D2D communication mode is preferably adopted, of the first UE; and/or one of conditions as follows:

the first base station, the MME or the ProSe function receives the message including a second mode switching request information from the first UE, and a packet data gateway, an SGW and/or the first base station perform(s) network burden reduction;

when the mode switching refers to switching from the D2D communication mode to the cellular communication mode, the first base station or the MME or the ProSe function acquires mode tendency information, which indicates that the cellular communication mode is preferably adopted, of the first UE; and/or, the first base station or the MME or the ProSe function receives the message including a second mode switching request information from the first UE.

In an example embodiment, the mode tendency information includes one of the followings: preference to the D2D communication mode, preference to the cellular communication information, no preference.

In an example embodiment, a range of the mode tendency information includes at least one of:

a UE level, an application level, a data stream level and a bearer level.

According to the method, the mode tendency information is stored in a Home Subscriber Server (HSS) or the ProSe function as subscription information of a UE, and the mode tendency information is configured and modified through the corresponding UE.

In an example embodiment, the second mode switching request information is directly sent through dedicated signalling or indirectly sent through a measurement report message.

In an example embodiment, the first mode switching request information and the second mode switching request information include at least one of the followings: an identifier of the second UE, a signal measurement result, obtained by the first UE, of the second UE, the signal measurement result, obtained by the first UE, of the first base station, the indication indicating which one of cellular communication and D2D communication is performed between the first UE and a second UE, bearer information corresponding to a data stream of the cellular communication or D2D communication between the first UE and a second UE, quality of service information corresponding to data stream and/or bearer of the cellular communication or D2D communication between the first UE and a second UE and an indication about whether the D2D communication data bearer has been established between the first UE and a second UE or not and/or the D2D communication data bearer is required to be established between the first UE and a second UE.

In an example embodiment, the first mode switching request information and the second mode switching request information include information of a second base station, wherein the second base station is a serving base station of a second UE.

According to another aspect of the disclosure, a mode switching method is further provided, which includes: first UE receives a message including mode switching information from a first base station, wherein the first base station is a serving base station of the first UE; and the first UE performs the mode switching according to indication information of a mode carried in the mode switching information.

In an example embodiment, the mode switching includes: switching from a cellular communication mode to a D2D communication mode and switching from the D2D communication mode to the cellular communication mode.

In an example embodiment, before the first UE performs the mode switching according to the indication information of the mode carried in the message comprising, the method further includes:

the first UE judges whether a condition of switching from the cellular communication mode to the D2D communication mode is met or not according to the received mode switching information; or the first UE judges whether a condition of switching from the D2D communication mode to the cellular communication mode is met or not according to the received mode switching information.

In an example embodiment, the step that the first UE receives the mode switching information, and judges whether the condition of switching from the cellular communication mode to the D2D communication mode is met or not includes:

the first UE judges whether the first UE supports a D2D communication function and/or passes D2D communication authorization and authentication or not; and the first UE judges whether there are enough D2D communication resources for D2D communication between the first UE and second UE or not.

In an example embodiment, the mode switching information includes:

a mode switching indication, a UE identifier, D2D communication data stream and/or bearer information for performing the mode switching and cellular communication data stream and/or bearer information for performing the mode switching.

In an example embodiment, the mode switching information contains at least one of the followings:

resource configuration information for D2D communication between the first UE and the second UE;

D2D communication/cellular communication bearer establishment and configuration information used for establishing a D2D communication/cellular communication bearer between the first UE and a second UE; and updated Trivial File Transfer (TFT) information.

In an example embodiment, the message including the mode switching information is born by Radio Resource Control (RRC) reconfiguration signalling or other dedicated signalling, and in addition, the mode switching information may be sent through an access stratum or transmitted through a protocol data unit of a non-access stratum.

In an example embodiment, the step that the first UE performs the mode switching according to the indication information in the mode switching information includes:

the first UE judges whether to establish data bearer of a cellular communication or data bearer of a D2D communication or not or judges according to the switched D2D communication/cellular communication indicated by the mode switching information, by the first UE, whether to modify data bearer of the cellular communication data bearer/D2D communication or not;

in the case that the first UE has not yet established the cellular communication/D2D communication data bearer, the first UE establishes the communication data bearer corresponding to the indication information of the mode switching information;

in the case that the first UE has established the cellular communication data bearer/D2D communication data bearer and the first UE has acquired updated TFT information, the first UE switches D2D communication data stream and/or data bearer or cellular communication data stream and/or data bearer indicated by the mode switching information to the bearer corresponding to the indication information of the mode switching information for communication;

in the case that the first UE is required to modify data bearer of the cellular communication or D2D communication, the first UE initiates an operation of modifying the data bearer; or in the case that the first UE is required to modify data bearer of cellular communication/D2D communication, initiating, by the first UE, an operation of modifying data bearer, wherein the cellular communication data bearer or D2D communication data bearer comprises configuration information corresponding to Packet Data Convergence Protocol, PDCP, Radio Link Control, RLC, and Media Access Control, MAC, entities and logic channels.

In an example embodiment, the method further includes: the first UE sends a message including mode switching completion information to the first base station; or the first UE initiates to release the D2D communication/cellular communication data bearer indicated by the mode switching information.

In an example embodiment, the step that in the case that the first UE has yet not established the cellular communication/D2D communication data bearer, the first UE establishes the communication data bearer indicated by the mode switching information includes:

when the mode switching refers to switching from cellular communication to D2D communication, the first UE establishes the D2D communication data bearer with the second UE through the first base station or directly, and updates the TFT information; and when the mode switching refers to switching from the D2D communication to the cellular communication, when the cellular communication data bearer between the first UE and the second UE has not been established, the first UE requests to establish the cellular communication data bearer, and updates the TFT information.

In an example embodiment, the first UE switches data stream and/or data bearer of the D2D communication or data stream and/or data bearer of the cellular communication indicated by the mode switching information to the bearer corresponding to the indication information of the mode switching information for communication includes:

when the mode switching refers to switching from cellular communication to D2D communication, implementing, by the first UE, through the D2D communication data bearer the D2D communication for the data stream, indicated by the mode switching information, of the first UE and the second UE by virtue of D2D communication resources of the first base station, which are scheduled by the first base station or for which are competed by the first UE; and when the mode switching refers to switching from the D2D communication to the cellular communication, implementing, by the first UE, through the cellular communication data bearer the cellular communication for the data stream indicated by the mode switching information, of the first UE and the second UE by virtue of cellular communication resources, which are scheduled by the first base station.

According to another aspect of the disclosure, a device for mode switching is further provided, which is applied to a first base station, including:

a sending component, configured to send a message including mode switching information to first UE to trigger the first UE to perform mode switching according to indication information of a mode in the mode switching information.

In an example embodiment, the device further includes:
a first judgment component, configured to judge whether the first UE meets a condition of the mode switching or not, wherein the first base station is a serving base station of the first UE.

In an example embodiment, the first judgment component includes:
a second sending component, configured to send a message including first mode switching request information to an MME or a ProSe function; and
a receiving component, configured to receive a message including mode switching response information from the MME or the ProSe function, wherein the first mode switching response information is used for indicating that the first UE meets the condition of the mode switching.

In an example embodiment, the first judgment component includes:
a second judgment component, configured to, when the following conditions are met, determine that the first UE meets a condition of switching from a cellular communication mode to a D2D communication mode:
the first UE supports a D2D communication function;
cellular communication is performed between the first UE and a second UE;
the first UE is in a proximity with the second UE;
there are enough D2D communication air interface resources for D2D communication between the first UE and the second UE;
a third judgment component, configured to, when at least one of the following conditions is met, determine that the first UE meets a condition of switching from the D2D communication mode to the cellular communication mode:
cellular communication is performed between the first UE and a second UE;
there are enough cellular communication air interface and backbone link resources;
the first UE is not in the proximity with the second UE;
wherein, the second UE refers to one of the followings: a UE which has established the cellular communication with the first UE and a UE which has established D2D communication with the first UE.

In an example embodiment, the device further includes:
a first acquisition component, configured to, when the mode switching refers to switching from the cellular communication mode to the D2D communication mode before the first judgement component judges whether the first UE meets the condition of the mode switching or not, acquire mode tendency information, which indicates that the D2D communication mode is preferably adopted, of the first UE; and/or one of conditions as follows:
the first base station receives a message including second mode switching request information from the first UE, and a packet data gateway, an SGW and/or the first base station perform(s) network burden reduction;
a second acquisition component, configured to, when mode switching refers to switching from the D2D communication mode to the cellular communication mode before the first judgement component judges whether the first UE meets the condition of the mode switching or not, acquire, by the first base station, mode tendency information, which indicates that the cellular communication mode is In an example embodiment adopted, of the first UE; and/or,
receive, by the first base station, the message including the second mode switching request information from the first UE.

In an example embodiment, the mode tendency information includes one of the followings: preference to the D2D communication mode, preference to the cellular communication information, no preference.

In an example embodiment, a range of the mode tendency information includes at least one of the followings:
a UE level, an application level, a data stream level and a bearer level.

In an example embodiment, the mode tendency information is stored in an HSS or the ProSe function as subscription information of a UE, and the mode tendency information is configured and modified through the corresponding UE.

In an example embodiment, a first mode switching request information and a second mode switching request information are directly sent through dedicated signalling or sent through a measurement report message.

In an example embodiment, a first mode switching request information and a second mode switching request information include at least one of the following: an identifier of the second UE, a signal measurement result, obtained by the first UE, of the second UE, a signal measurement result, obtained by the first UE, of the first base station, an indication about cellular communication or D2D communication between the first UE and the second UE, bearer information corresponding to a cellular communication or D2D communication data stream between the first UE and the second UE, quality of service information corresponding to data stream and/or bearer of the cellular communication or D2D communication between the first UE and the second UE and an indication about whether data bearer of the D2D communication is established between the first UE and the second UE or not and/or data bearer of the D2D communication is required to be established between the first UE and the second UE.

In an example embodiment, the first mode switching request information and the second mode switching request information include information of a second base station, wherein the second base station is a serving base station of the second UE.

According to another aspect of the disclosure, a device for mode switching is further provided, which is applied to first UE, including: a receiving component, configured to receive a message including mode switching information from a first base station, wherein the first base station is a serving base station of the first UE; and a switching component, configured to perform mode switching according to indication information of a mode in the mode switching information.

In an example embodiment, the mode switching includes: switching from a cellular communication mode to a D2D communication mode and switching from the D2D communication mode to the cellular communication mode.

In an example embodiment, the device further includes: a fourth judgment component, configured to judge whether a condition of switching from the cellular communication mode to the D2D communication mode is met or not according to the received mode switching information; and a fifth judgment component, configured to judge whether a condition of switching from the D2D communication mode to the cellular communication mode is met or not according to the received mode switching information.

By the technical solutions provided by the embodiment of the disclosure, the first eNB sends the message including the mode switching information to the first UE to trigger the first UE to perform mode switching according to the indication information of a mode in the mode switching information, so that the problem of poorer service continuity caused by mode switching inflexibility in the related technology is solved, and the effect of improving overall throughput of a system is further achieved.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments of the disclosure and the features of the embodiments may be combined with each other when there is no conflict.

Figure 1:
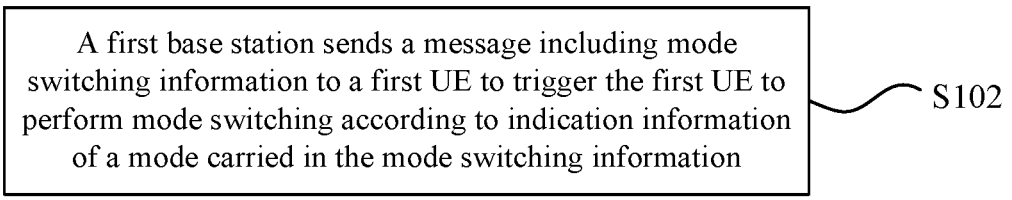
FIG. 1 is a first flowchart of a method for mode switching according to an embodiment of the disclosure.

The embodiment provides a method for mode switching, FIG. 1 is a first flowchart of a method for mode switching according to an embodiment of the disclosure, and as shown in FIG. 1, the method includes the following step (Step 102):

Step 102: a first eNB sends a message including mode switching information to a first UE to trigger the first UE to perform mode switching according to indication information of a mode carried in the mode switching information.

As an example implementation mode, in order to improve a reliability of the mode switching, before Step 102, the method further includes: the first eNB determines the first UE meets a condition of the mode switching, wherein the first eNB is a serving eNB of the first UE.

In an example embodiment, the first eNB may determine that the first UE meets the condition of the mode switching in one of manners as follows:

Manner 1: the first eNB sends a first mode switching request to an MME or a ProSe function; and the first eNB receives a first mode switching response message sent by the MME or the ProSe function, wherein the first mode switching response message is used for indicating that the first UE meets the condition of the mode switching.

Manner 2: the first eNB receives a message which is sent, by the MME or the ProSe function, to the first eNB and used for indicating the first UE to perform the mode switching.

As an example implementation mode, the first eNB, the MME or the ProSe function determines that the first UE meets the condition of the mode switching includes: when the following conditions are met, the first UE is determined to meet a condition of switching from a cellular communication mode to a D2D communication mode:

1) the first UE supports a D2D communication function or passes D2D communication authorization and authentication;

2) cellular communication is performed between the first UE and the second UE;

3) the first UE is in a proximity with the second UE; and 4) there are enough D2D communication air interface resources for D2D communication between the first UE and the second UE;

when one of the following conditions is met, the first UE is determined to meet a condition of switching from the D2D communication mode to the cellular communication mode:

1) D2D communication is performed between the first UE and the second UE, and there are enough cellular communication air interface and backbone link resources;

2) D2D communication is performed between the first UE and the second UE the first UE is not in the proximity with the second UE, and there are enough cellular communication air interface and backbone link resources;

wherein, the second UE refers to one of the followings: a UE which has established cellular communication with the first UE, a UE which has established D2D communication with the first UE.

In an example embodiment, the first eNB may judge whether the first UE is in the proximity with the second UE or not in one of manners as follows:

Manner 1: the first eNB configures signal measurement to be performed by the first UE over the second UE, judges whether a D2D communication link quality threshold is met or not according to a measurement report sent by the first UE, determines that the first UE is in the proximity with the second UE when the D2D communication link quality threshold is met, or determines that the first UE is not in the proximity with the second UE when the D2D communication link quality threshold is not met;

Manner 2: the first eNB judges whether a D2D communication link quality threshold is met or not according to a signal measurement result, obtained by the first UE, of the second UE carried in a received message, sent by the first UE, including first mode switching request information, determines that the first UE is in the proximity with the second UE when the D2D communication link quality threshold is met, or determines that the first UE is not in the proximity with the second UE when the D2D communication link quality threshold is not met; or Manner 3: the first eNB acquires information about whether the first UE is in the proximity with the second UE or not from a network side entity, judges whether a distance between the first UE and the second UE meets a D2D communication distance threshold or not, determines that the first UE is in the proximity with the second UE when the distance meets the D2D communication distance threshold, or determines that the first UE is not in the proximity with the second UE when the distance does not meet the D2D communication distance threshold; or Manner 4: the first eNB acquires geographical location information or distance information of the first UE and the second UE from a network side entity, judges whether a distance between the first UE and the second UE meets a D2D communication distance threshold or not, determines that the first UE is in the proximity with the second UE when the distance meets the D2D communication distance threshold, or determines that the first UE is not in the proximity with the second UE when the distance does not meet the D2D communication distance threshold;

wherein, when the first UE is in the proximity with the second UE, the first eNB determines that the first UE and the second UE are qualified to perform D2D communication; or when the first UE is not in the proximity with the second UE, the first eNB determines that the first UE and the second UE are able to perform cellular communication only.

During implementation, the first mode switching request information may include at least one of the following:

an identifier of the second UE, a signal measurement result, obtained by the first UE, of the second UE, a signal measurement result, obtained by the first UE, of the first eNB, an indication indicating which one of cellular communication and D2D communication is being conducted between the first UE and the second UE, bearer information corresponding to a data stream of the cellular communication or the D2D communication between the first UE and the second UE, quality of service information corresponding to data stream and/or bearer of the cellular communication or the D2D communication between the first UE and the second UE and an indication about whether data bearer of the D2D communication has been established between the first UE and the second UE or not and/or data bearer of the D2D communication is required to be established between the first UE and the second UE.

In an example embodiment, the network side entity includes one of the followings: a packet data gateway serving the UE, an SGW, an MME, a ProSe function, a location information server and an entity with a UE discovery and detection function.

In an example embodiment, the first eNB judges whether there are enough D2D communication air interface resources for the D2D communication between the first UE and the second UE or not includes:

the first eNB judges whether there are enough D2D communication resources supporting corresponding D2D communication or not according to the bearer information corresponding to data stream of the cellular communication between the first UE and the second UE and the quality of service information corresponding to data stream and/or bearer of the cellular communication between the first UE and the second UE; and when a judgment result indicates that there are enough D2D air interface resources supporting data stream of the cellular communication between the first UE and the second UE, the first eNB determines that there are enough D2D communication air interface resources for the D2D communication between the first UE and the second UE.

In an example embodiment, the first eNB may judge whether there are enough cellular communication air interface and backbone link resources or not in a manner as follows: the first eNB judges whether there are enough cellular communication air interface and backbone link resources supporting corresponding cellular communication or not according to the bearer information corresponding to the data stream of the D2D communication between the first UE and the second UE and the quality of service information corresponding to the data stream and/or bearer of the D2D communication between the first UE and the second UE, wherein, when there are enough cellular communication air interface and backbone link resources supporting the data stream and/or bearer of the D2D communication between the first UE and the second UE, the first eNB determines that there are enough cellular communication air interface and backbone link resources for the cellular communication between the first UE and the second UE.

As an example implementation mode, that the first eNB triggers the first UE to perform the mode switching in Step 102 may be implemented in a manner as follows:

the first eNB determines a second eNB, and the second eNB judges whether the second UE meets a condition of the mode switching or not, wherein, when the first eNB is different from the second eNB, the first eNB initiates mode switching negotiation with the second eNB to ensure whether the second UE meets the condition of the mode switching or not; and when the second eNB determines that the second UE meets the condition of the mode switching, the first eNB and the second eNB send messages including the mode switching information to require the first UE and the second UE to execute the mode switching.

As another example implementation mode, when the first eNB determines that the first UE does not meet the condition of the mode switching, the first eNB may send a message including mode switching reject information; or, the first eNB receives the message including the mode switching reject information from the first UE, wherein the mode switching refusing message includes refusing reason indication information.

During implementation, the first eNB may initiate mode switching negotiation with the second eNB in a manner as follows: the first eNB sends a message including mode switching negotiation request information to the second eNB; the second eNB receives the message including the mode switching negotiation request information, and judges whether the second UE meets the condition of the mode switching or not; when the second UE meets the condition of the mode switching, the second eNB sends a message including mode switching negotiation request confirmation information to the first eNB, or when the second UE does not meet the condition of the mode switching, the second eNB sends a message including mode switching negotiation failure information to the first eNB, the mode switching negotiation failure information containing a failure reason indication; and when the first eNB receives the message including the mode switching negotiation request confirmation information, the first eNB determines that the mode switching negotiation succeeds; or after sending the message including the mode switching negotiation request information to the second eNB, the first eNB sends a message including mode switching negotiation cancellation information to the second eNB to cancel the mode switching negotiation which is being performed.

In an example embodiment, the mode switching negotiation request information may carries at least one of the followings: an identifier of the first UE, an identifier of the second UE, the bearer information corresponding to the cellular communication/D2D communication data stream supported by the first eNB between the first UE and the second UE, the quality of service information corresponding to the cellular communication/D2D communication data stream and/or bearer supported by the first eNB between the first UE and the second UE, the indication about whether the corresponding D2D communication/cellular communication bearer has been established between the first UE and the second UE or not and/or an indication indicating that the D2D communication/cellular communication bearer is required to be established between the first UE and the second UE, a D2D communication resource mode configured for the first UE by the first eNB and D2D capability information of the first UE; and the mode switching negotiation request information may explicitly include one or more mode switching types.

As another example implementation mode, before the step that the first eNB, the MME or the ProSe function judges whether the first UE meets the condition of the mode switching or not, the method further includes:

when the mode switching refers to switching from the cellular communication mode to the D2D communication mode, the first eNB, the MME or the ProSe function acquires mode tendency information, which indicates that the D2D communication mode is preferably adopted, of the first UE; and/or one of conditions as follows:

the first eNB, the MME or the ProSe function receives the message including a second mode switching request information from the first UE, and a packet data gateway, an SGW and/or the first eNB perform(s) network burden reduction;

when the mode switching refers to switching from the D2D communication mode to the cellular communication mode, the first eNB or the MME or the ProSe function acquires mode tendency information, which indicates that the cellular communication mode is preferably adopted, of the first UE; and/or, the first eNB or the MME or the ProSe function receives the message including a second mode switching request information from the first UE.

In an example embodiment, the mode tendency information includes one of the followings:
1) preference to the D2D communication mode;
2) preference to the cellular communication information;
3) no preference.

In an example embodiment, a range of the mode tendency information includes at least one of: a UE level, an application level, a data stream level and a bearer level.

In an example embodiment, the mode tendency information is stored in an HSS or the ProSe function as subscription information of a UE, and the mode tendency information is configured and modified through the corresponding UE.

In an example embodiment, the second mode switching request information is directly sent through dedicated signalling or indirectly sent through a measurement report message.

In an example embodiment, the first mode switching request information and the second mode switching request information include at least one of the followings: an identifier of a second UE, an signal measurement result, obtained by the first UE, of a second UE, an signal measurement result, obtained by the first UE, of the first eNB, an indication indicating which one of cellular communication and D2D communication is performed between the first UE and a second UE, the bearer information corresponding to a data stream of cellular communication or D2D communication between the first UE and a second UE, quality of service information corresponding to data stream and/or bearer of the cellular communication or D2D communication between the first UE and a second UE and an indication about whether D2D communication data bearer has been established between the first UE and a second UE or not and/or the D2D communication data bearer is required to be established between the first UE and a second UE.

In an example embodiment, the first mode switching request information and the second mode switching request information include information of a second eNB, wherein the second eNB is a serving eNB of a second UE.

Figure 2:
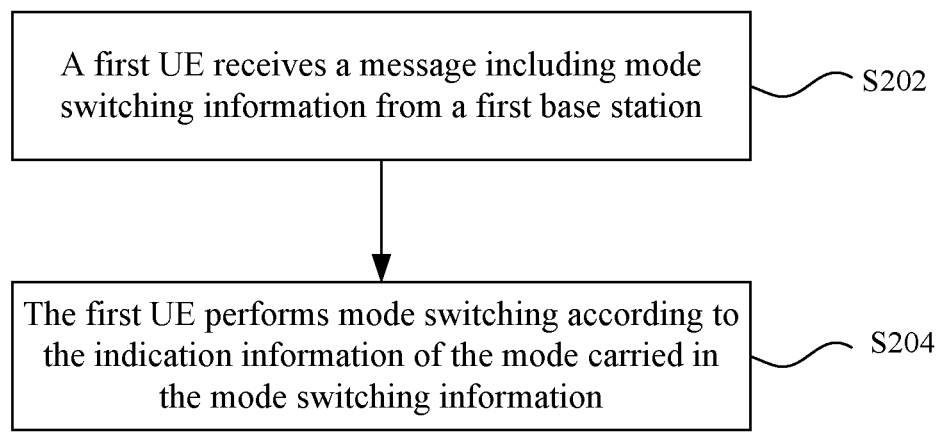
FIG. 2 is a second flowchart of a method for mode switching according to an embodiment of the disclosure.

The embodiment provides another method for mode switching, FIG. 2 is a second flowchart of a method for mode switching according to an embodiment of the disclosure, and as shown in FIG. 2, the method includes the following steps (Step 202 to Step 204):

Step 202: a first UE receives a message including mode switching information from a first eNB, wherein the first eNB is a serving eNB of the first UE; and Step 204: the first UE performs the mode switching according to indication information of a mode carried in the mode switching information.

In an example embodiment, the mode switching includes: switching from a cellular communication mode to a D2D communication mode and switching from the D2D communication mode to the cellular communication mode.

As an example implementation mode, before Step 204, the method further includes: the first UE judges whether a condition of switching from cellular communication mode to D2D communication mode is met or not according to the received message including the mode switching information; or the first UE judges whether a condition of switching from the D2D communication mode to the cellular communication mode is met or not according to the received mode switching information.

In an example embodiment, the first UE receives the message including the mode switching information, and judges whether the condition of switching from the cellular communication mode to the D2D communication mode is met or not includes: the first UE judges whether a D2D communication function is supported or not; and the first UE judges whether there are enough D2D communication resources for the D2D communication between the first UE and a second UE or not.

During implementation, the mode switching information may include: a mode switching indication, a UE identifier, D2D communication data stream and/or bearer information for performing the mode switching and cellular communication data stream and/or bearer information for performing the mode switching.

In an example embodiment, the mode switching information may contain at least one of the followings: resource configuration information for D2D communication between the first UE and a second UE; D2D communication/cellular communication bearer establishment and configuration information used for establishing a D2D communication/cellular communication bearer between the first UE and a second UE; and updated TFT information.

In an example embodiment, the mode switching information is born by RRC reconfiguration signalling or other dedicated signalling, and in addition, the mode switching information may be sent through an access stratum or transmitted through a protocol data unit of a non-access stratum.

As another example implementation mode, the first UE performs the mode switching according to the indication information in the mode switching information may include: the first UE judges whether to establish data bearer of a cellular communication or data bearer of a D2D communication or not or judges according to the switched D2D communication/cellular communication indicated by the mode switching information, by the first UE, whether to modify data bearer of the cellular communication data bearer/D2D communication or not; in the case that the first UE has not yet established the cellular communication/D2D communication data bearer, the first UE establishes the communication data bearer corresponding to the indication information of the mode switching information; in the case that the first UE has established the cellular communication data bearer/D2D communication data bearer and the first UE has acquired updated TFT information, the first UE switches the D2D communication data stream and/or data bearer or cellular communication data stream and/or data bearer indicated by the mode switching information to the bearer corresponding to the indication information of the mode switching information for communication; and in the case that the first UE is required to modify data bearer of cellular communication or D2D communication, the first UE initiates an operation of modifying data bearer; or in the case that the first UE is required to modify data bearer of cellular communication/D2D communication, initiating, by the first UE, an operation of modifying data bearer, wherein the cellular communication data bearer or D2D communication data bearer comprises configuration information corresponding to Packet Data Convergence Protocol, PDCP, Radio Link Control, RLC, and Media Access Control, MAC, entities and logic channels.

In an example embodiment, the method further includes: the first UE sends a message including mode switching completion information to the first eNB; or the first UE initiates to release the D2D communication/cellular communication data bearer indicated by the mode switching information.

As another example implementation mode, in the case that the first UE has yet not established the cellular communication/D2D communication data bearer, the first UE establishes the communication data bearer indicated by the mode switching information includes:

when the mode switching refers to switching from cellular communication to D2D communication, the first UE establishes the D2D communication data bearer with the second UE through the first eNB or directly, and updates the TFT information; and when the mode switching refers to switching from the D2D communication to the cellular communication, when the cellular communication data bearer between the first UE and the second UE has not been established, the first UE requests to establish the cellular communication data bearer, and updates the TFT information.

In an example embodiment, the first UE switches the data stream and/or data bearer of the D2D communication or the data stream and/or data bearer of the cellular communication indicated by the mode switching information to the bearer corresponding to the indication information of the mode switching information for communication includes:

when the mode switching refers to switching from cellular communication to D2D communication, implementing, by the first UE, through the D2D communication data bearer the D2D communication for the data stream, indicated by the mode switching information, of the first UE and the second UE by virtue of D2D communication resources of the first eNB, which are scheduled by the first eNB or for which are competed by the first UE; and when the mode switching refers to switching from the D2D communication to the cellular communication, implementing, by the first UE, through the cellular communication data bearer the cellular communication for the data stream indicated by the mode switching information, of the first UE and the second UE by virtue of cellular communication resources, which are scheduled by the first eNB.

Figure 3:
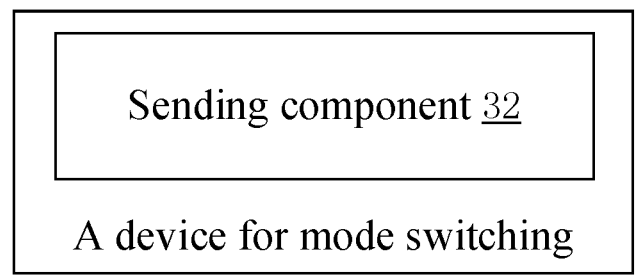
FIG. 3 is a first structural block diagram of a device for mode switching according to an embodiment of the disclosure.

The embodiment provides a device for mode switching, FIG. 3 is a first structural block diagram of a mode switching device according to an embodiment of the disclosure, and as shown in FIG. 3, the device includes: a sending component 32, configured to send a message including mode switching information to a first UE to trigger the first UE to perform mode switching according to indication information of a mode in the mode switching information.

Figure 4:
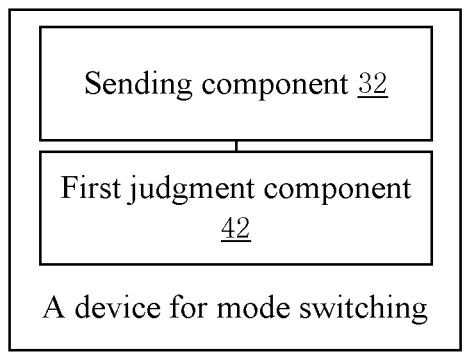
FIG. 4 is a first structural block diagram of a device for mode switching according to an example embodiment of the disclosure.

FIG. 4 is a first example structural block diagram of a device for mode switching according to an embodiment of the disclosure, and as shown in FIG. 4, the method further includes: a first judgment component 42, configured to judge whether the first UE meets a condition of mode switching or not, wherein the first eNB is a serving eNB of the first UE.

Figure 5:
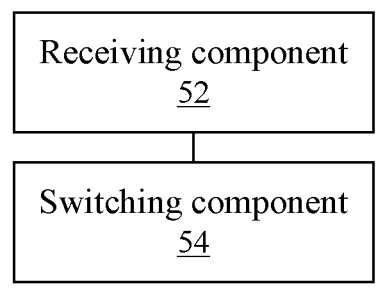
FIG. 5 is a second structural block diagram of a device for mode switching according to an embodiment of the disclosure.

The embodiment provides a device for mode switching, which is applied to first UE, FIG. 5 is a second structural block diagram of a device for mode switching according to an embodiment of the disclosure, and as shown in FIG. 5, the device includes: a receiving component 52, configured to receive a message including mode switching information from a first eNB, wherein the first eNB is a serving eNB of the first UE; and a switching component 54, configured to perform the mode switching according to indication information of a mode in the mode switching information.

Figure 6:
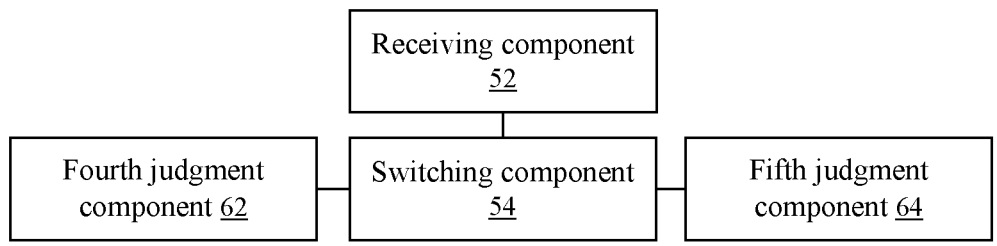
FIG. 6 is a second structural block diagram of a device for mode switching according to an example embodiment of the disclosure.
Figure 7:
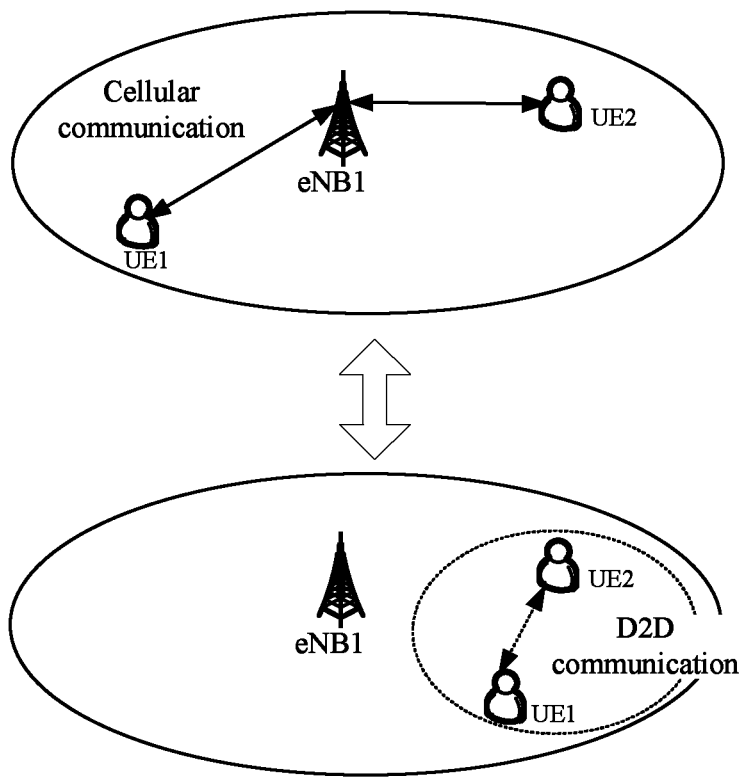
FIG. 7 is a schematic diagram of mode switching of a D2D system according to an embodiment of the disclosure.

FIG. 6 is a second example structural block diagram of a device for mode switching according to an embodiment of the disclosure, and as shown in FIG. 6, the device further includes: a fourth judgment component 62, configured to judge whether a condition of switching from the cellular communication mode to the D2D communication mode is met or not according to the received mode switching information; and a fifth judgment component 64, configured to judge whether a condition of switching from the D2D communication mode to the cellular communication mode is met or not according to the received mode switching information.

Example Embodiment 1

Figure 8:
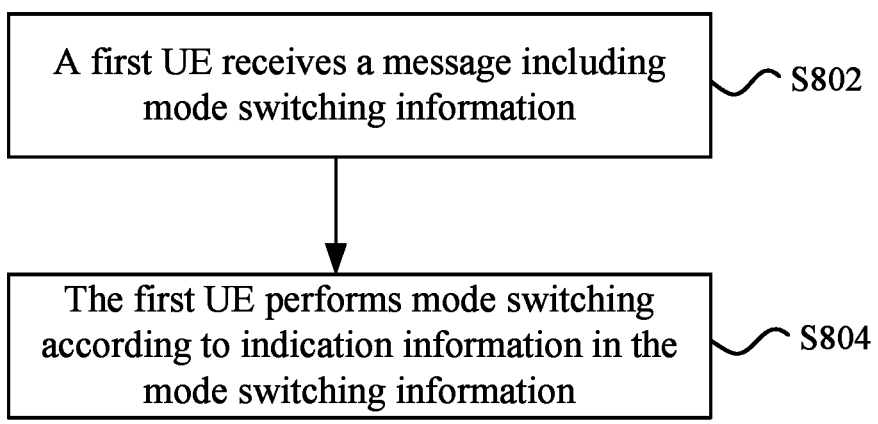
FIG. 8 is a flowchart of a method for mode switching according to an example embodiment of the disclosure.

The example embodiment provides an equipment mode switching method for a D2D system. FIG. 8 is a flowchart of a method for mode switching according to an example embodiment of the disclosure, and as shown in FIG. 8, the method includes Step 802 and Step 804.

Step 802: a first UE receives a mode switching message.

Step 804: the first UE performs mode switching according to indication information in the mode switching message.

In an example embodiment, modes include: a cellular communication mode and a D2D communication mode.

In an example embodiment, mode switching includes two types: switching from a cellular communication mode to a D2D communication mode and switching from the D2D communication mode to the cellular communication mode.

As an example implementation mode, before the first UE receives the mode switching message, the method further includes: a first eNB judges whether the first UE meets a condition of mode switching or not, and when the first UE meets the condition, the first eNB initiates the mode switching; and when the first UE does not meet the condition, the first eNB optionally sends a mode switching refusing message.

In an example embodiment, the first eNB refers to a serving eNB of the first UE.

As another example implementation mode, the first eNB judges whether the first UE meets the condition of the mode switching or not further includes: the first eNB sends a mode switching request to an MME or a ProSe function; the MME or the ProSe function receives the mode switching request and judges whether the first UE meets the condition of the mode switching or not. The MME or the ProSe function sends a mode switching response message to the first eNB when the first UE meets the condition, otherwise the MME or the ProSe function sends the mode switching refusing message to the first eNB; and when the first eNB receives the mode switching response message, the first eNB determines that the first UE meets the condition of the mode switching.

In an example embodiment, the first eNB or the MME or the ProSe function judges whether the first UE meets a condition of switching from the cellular communication mode to the D2D communication mode or not further includes: the first eNB or the MME or the ProSe function judges whether the first UE supports a D2D communication function or not; the first eNB or the MME or the ProSe function judges whether the first UE performs cellular data communication with second UE or not; the first eNB or the MME or the ProSe function judges whether the first UE is proximal to the second UE or not; and the first eNB or the MME or the ProSe function judges whether there are enough D2D communication air interface resources for D2D communication between the first UE and the second UE or not.

In an example embodiment, the first eNB or the MME or the ProSe function judges whether the first UE meets a condition of switching from the D2D communication mode to the cellular communication mode or not includes: the first eNB or the MME or the ProSe function judges whether the first UE performs D2D data communication with the second UE or not; the first eNB or the MME or the ProSe function judges whether there are enough cellular communication air interface or backbone link resources or not; and/or, the first eNB or the MME or the ProSe function judges whether the first UE is proximal to the second UE.

In an example embodiment, the second UE refers to a UE with which the first UE wants to establish D2D communication or a UE which has established D2D communication with the first UE.

In an example embodiment, before the first eNB or the MME or the ProSe function judges whether the first UE meets the condition of switching from the cellular communication mode to the D2D communication mode or not, the method further includes:

mode tendency information of the first UE indicates that the D2D communication mode is preferably adopted; and/or the first eNB receives the mode switching request from the first UE; or a packet data gateway and/or an SGW and/or the eNB perform(s) network burden reduction.

In an example embodiment, before the first eNB or the MME or the ProSe function judges whether the first UE meets the condition of switching from the D2D communication mode to the cellular communication mode or not, the method further includes:

the mode tendency information of the first UE indicates that the cellular communication mode is preferably adopted; and/or the first eNB receives the mode switching request from the first UE.

In an example embodiment, the mode tendency information of the first UE further includes at least one of the followings:

1) preference to the D2D communication mode;
2) preference to the cellular communication mode;
3) no preference.

A range of the mode tendency information of the first UE includes at least one of the followings: a UE level, an application level, a data stream level and a bearer level.

In an example embodiment, the mode tendency information of the first UE may be stored in an HSS or the ProSe function or another function entity with a UE D2D storage attribute as subscription information of the first UE;

the mode tendency information of the first UE may be configured and modified by the first UE;

the first UE or the MME or the ProSe function or the other function entity sends a message including the mode tendency information of the first UE; and the first eNB receives the message, and acquires the mode tendency information of the first UE from the message.

In an example embodiment, before the first eNB receives the mode switching request of the first UE, the method further includes:

the first UE sends a mode switching request message to request for switching to the D2D communication or the cellular communication.

In an example embodiment, the mode switching request message may be sent through proprietary signalling or born by another message, such as a measurement report message, explicitly including the mode switching request information; and the mode switching request message may be sent through the proprietary signalling or born by another message, such as the measurement report message, explicitly including the mode switching request information further includes:

the mode switching request message may include at least one of the followings: an identifier of the second UE, a signal measurement result, obtained by the first UE, of the second UE, a signal measurement result, obtained by the first UE, of a serving eNB, an indication about the cellular communication/the D2D communication between the first UE and the second UE, bearer information corresponding to data stream of the cellular communication/the D2D communication between the first UE and the second UE, quality of service information corresponding to data stream and/or bearer of the cellular communication/D2D communication between the first UE and the second UE and an indication about whether the D2D communication data bearer is established between the first UE and the second UE or not and/or the D2D communication data bearer is required to be established between the first UE and the second UE.

In an example embodiment, the mode switching request message may explicitly include one or more mode switching types.

In an example embodiment, the mode switching request message optionally includes information of the second eNB.

In an example embodiment, the bearer information corresponding to the data stream of the cellular communication/D2D communication between the first UE and the second UE and the quality of service information corresponding to the data stream of the cellular communication/D2D communication between the first UE and the second UE correspond to a part of data streams and/or bearers with a requirement on the mode switching.

In an example embodiment, the second eNB refers to a serving eNB of the second UE.

In an example embodiment, the first eNB judges whether the first UE performs cellular data communication with the second UE or not further includes:

the first eNB learns about whether the first UE performs the cellular data communication with the second UE or not according to the indication about the cellular communication between the first UE and the second UE in the received mode switching request message; or the first eNB performs packet header detection on a communication data packet of a UE served by the first eNB, and judges whether the first UE performs the cellular communication with the second UE served by the second eNB or not according to source and destination addresses; or the first eNB acquires information about whether the first UE performs the cellular data communication with the second UE or not from another network side entity.

In an example embodiment, the first eNB judges whether the first UE performs the D2D communication with the second UE or not further includes:

the first eNB learns about whether the first UE performs the D2D data communication with the second UE or not according to the indication about the D2D communication between the first UE and the second UE in the received mode switching request message; or the first eNB learns about whether the first UE performs the D2D communication with the second UE or not according to stored context information of the first UE; or the first eNB acquires information about whether the first UE performs the D2D communication with the second UE or not from the other network side entity.

In an example embodiment, the first eNB judges whether the first UE is proximal to the second UE or not further includes:

the first eNB configures signal measurement of the first UE over the second UE, and judges whether a D2D communication link quality threshold is met or not according to a measurement report of the first UE; or the first eNB judges whether the D2D communication link quality threshold is met or not according to the signal measurement result, obtained by the first UE, of the second UE in the received mode switching request message, determines that the first UE is proximal to the second UE when the D2D communication link quality threshold is met, and determines that the first UE is not proximal to the second UE when the D2D communication link quality threshold is not met; or the first eNB acquires information about whether the first UE is proximal to the second UE or not from the other network side entity; or the first eNB may acquire geographical location information or distance information of the first UE and the second UE from the other network side entity, judges whether a distance between the first UE and the second UE meets a D2D communication distance threshold or not, determines that the first UE is proximal to the second UE when the distance meets the D2D communication distance threshold, otherwise determines that the first UE is not proximal to the second UE.

In an example embodiment, when the first UE is proximal to the second UE, the first eNB determines that the first UE and the second UE are qualified to perform the D2D communication; and when the first UE is not proximal to the second UE, the first eNB determines that the first UE and the second UE may perform cellular communication only.

In an example embodiment, the network side entity includes one of the followings: a packet data gateway serving the UE, an SGW, an MME, a ProSe function or another entity with a UE discovery detection function.

In an example embodiment, the first eNB judges whether there are enough D2D communication air interface resources for the D2D communication between the first UE and the second UE or not further includes:

the first eNB judges whether there are enough D2D communication resources supporting corresponding D2D communication or not according to the bearer information corresponding to data stream of the cellular communication between the first UE and the second UE and the quality of service information corresponding to data stream and/or bearer of the cellular communication between the first UE and the second UE; and when there are enough D2D air interface resources supporting the cellular communication data stream between the first UE and the second UE, the first eNB determines that the condition that there are enough D2D communication air interface resources for D2D communication between the first UE and the second UE is met, otherwise determines that the condition is not met.

In an example embodiment, the first eNB judges whether there are enough cellular communication air interface and backbone link resources or not further includes:

the first eNB judges whether there are enough cellular communication air interface and backbone link resources supporting corresponding cellular communication or not according to the bearer information corresponding to the data stream of the D2D communication between the first UE and the second UE and the quality of service information corresponding to the data stream and/or bearer of the D2D communication between the first UE and the second UE; and optionally, when there are enough cellular communication air interface and backbone link resources supporting all or a part of the data streams and/or bearers of the D2D communication between the first UE and the second UE, the first eNB determines that the condition that there are enough cellular communication air interface and backbone link resources for the cellular communication between the first UE and the second UE is met, otherwise determines that the condition is not met.

In an example embodiment, the first eNB initiates mode switching of the first UE when the condition is met further includes:

the first eNB determines the second eNB, and the second eNB judges whether the second UE meets the condition of the mode switching or not; furthermore, when the first eNB is different from the second eNB, the first eNB initiates mode switching negotiation with the second eNB to judge whether the second UE meets the condition of the mode switching or not; and when the second eNB determines that the second UE meets the condition of the mode switching, the first eNB and the second eNB send mode switching messages to require the first UE and the second UE to execute the mode switching.

In an example embodiment, the first eNB optionally sends the mode switching refusing message when the condition is not met further includes:

the first eNB receives the mode switching request message from the first UE.

In an example embodiment, the mode switching refusing message includes refusing reason indication information.

In an example embodiment, the first eNB initiates mode switching negotiation with the second eNB further includes:

the first eNB sends a mode switching negotiation request message to the second eNB;

the second eNB receives the mode switching negotiation request message, and judges whether the second UE meets the condition of the mode switching or not;

when the second UE meets the condition of the mode switching, the second eNB sends a mode switching negotiation request confirmation message to the first eNB, otherwise the second eNB sends a mode switching negotiation failure message to the first eNB, the mode switching negotiation failure message containing a failure reason indication; and when the first eNB receives the mode switching negotiation request confirmation message, mode switching negotiation succeeds.

In an example embodiment, after sending the mode switching negotiation request message to the second eNB, the first eNB may send a mode switching negotiation cancellation message to the second eNB to cancel mode switching negotiation which is being performed.

In an example embodiment, the step that the first eNB sends the mode switching negotiation request message to the second eNB further includes:

the mode switching negotiation request message may contain at least one of the followings: the identifier of the first UE, the identifier of the second UE, the bearer information corresponding to the cellular communication/D2D communication data stream supported by the first eNB between the first UE and the second UE, the quality of service information corresponding to the cellular communication/D2D communication data stream and/or bearer supported by the first eNB between the first UE and the second UE, the indication about whether the corresponding D2D communication/cellular communication bearer is established between the first UE and the second UE or not and/or the D2D communication/cellular communication bearer is required to be established between the first UE and the second UE, D2D communication resources which may be configured for the first UE by the first eNB and D2D capability information of the first UE.

In an example embodiment, the mode switching negotiation request message may explicitly include one or more mode switching types.

In an example embodiment, the second eNB judges whether the second UE meets the condition of switching from the cellular communication mode to the D2D communication mode or not further includes:

the second eNB judges whether the second UE supports the D2D communication function or not; and the second eNB judges whether there are enough D2D communication resources for D2D communication between the first UE and the second UE or not.

The second eNB judges whether the second UE meets the condition of switching from the D2D communication mode to the cellular communication mode or not includes:

the second eNB judges whether there are enough air interface and backbone link resources or not.

In an example embodiment, the second eNB judges whether there are enough D2D communication air interface resources for D2D communication between the first UE and the second UE further includes:

the second eNB judges whether there are corresponding resources allocated to the second UE for the D2D communication or not according to the received bearer information corresponding to the D2D communication data stream supported by the first eNB between the first UE and the second UE, the received quality of service information corresponding to data stream and/or bearer of the cellular communication between the first UE and the second UE and/or D2D communication air interface resource information which may be allocated to the first UE by the serving eNB of the first UE; and when the D2D communication air interface resources may support all or a part of the cellular communication data stream supported by the first eNB between the first UE and the second UE, the second eNB determines that the condition that there are enough D2D communication air interface resources for D2D communication between the first UE and the second UE is met, otherwise determines that the condition is not met.

In an example embodiment, the second eNB judges whether there are enough air interface and backbone link resources or not further includes:

the second eNB judges whether there are enough cellular communication air interface and backbone link resources supporting corresponding cellular communication or not according to the received bearer information corresponding to the D2D communication data stream supported by the first eNB between the first UE and the second UE and the received quality of service information corresponding to data stream and/or bearer of the D2D communication between the first UE and the second UE; and further optionally, when the cellular communication air interface and backbone link resources may support all or a part of the D2D communication data stream and/or bearer supported by the first eNB between the first UE and the second UE, the second eNB determines that the condition that there are enough cellular communication air interface and backbone link resources for the cellular communication between the first UE and the second UE is met, otherwise determines that the condition is not met.

In an example embodiment, the second eNB sends the mode switching negotiation request confirmation message to the first eNB further includes:

the switching negotiation request confirmation message may contain at least one of the followings: bearer information corresponding to a D2D communication/cellular communication data stream supported by the second eNB between the first UE and the second UE, quality of service information corresponding to the D2D communication/cellular communication data stream and/or bearer supported by the second eNB between the first UE and the second UE, resource information which may be allocated to the first UE and the second UE for the D2D communication and capability information supported by both the first UE and the second UE.

Furthermore, the switching negotiation request confirmation message may further include the following information: bearer information corresponding to a D2D communication/cellular communication data stream which is not supported by the second eNB between the first UE and the second UE and quality of service information corresponding to the D2D communication/cellular communication data stream and/or bearer which is not supported by the second eNB between the first UE and the second UE.

In an example embodiment, the second eNB judges whether the second UE meets the condition of the mode switching or not may further include:

the second eNB sends a mode switching negotiation request message to the second UE;

the second UE receives the mode switching negotiation request message, judges whether the condition of the mode switching is met or not. The second UE sends a mode switching negotiation request confirmation message when the condition is met, otherwise sends a mode switching negotiation failure message, the mode switching negotiation failure message including a failure reason indication; and when the second eNB receives the mode switching negotiation request confirmation message, the second UE is determined to meet the condition of the mode switching.

In an example embodiment, the mode switching negotiation request message may contain at least one of the followings: the identifier of the first UE, the bearer information corresponding to the cellular communication/D2D communication supported by the first eNB between the first UE and the second UE, the quality of service information corresponding to the cellular communication/D2D communication data stream and/or bearer supported by the first eNB between the first UE and the second UE, the D2D communication resource which may be allocated to the first UE by the first eNB and the capability information of the first UE; and furthermore, the mode switching negotiation request message may explicitly include one or more mode switching types.

In an example embodiment, the mode switching negotiation request confirmation message may include at least one of the followings: the identifier of the first UE, bearer information corresponding to a D2D communication/cellular communication data stream supported by the second UE between the first UE and the second UE, quality of service information corresponding to the D2D communication/cellular communication data stream and/or bearer supported by the second UE between the first UE and the second UE, resource information which may be allocated to the first UE and the second UE for D2D communication and the capability information supported by both the first UE and the second UE.

In an example embodiment, the mode switching negotiation request confirmation message may further include the following information: bearer information corresponding to a D2D communication/cellular communication data stream which is not supported by the second UE between the first UE and the second UE and quality of service information corresponding to the D2D communication/cellular communication data stream and/or bearer which is not supported by the second UE between the first UE and the second UE.

In an example embodiment, the second UE receives the mode switching request message and judges whether the condition of switching from the cellular communication mode to the D2D communication mode is met or not further includes:

the second UE judges whether the second UE supports the D2D communication function and/or passes D2D communication authorization and authentication or not; and the second UE judges whether there are enough D2D communication resources for D2D communication between the first UE and the second UE or not.

In an example embodiment, the first eNB and the second eNB respectively sends a mode switching message to require the first UE and the second UE to execute the mode switching further includes:

the mode switching message include the identifiers of a UE and switched D2D communication/cellular communication data stream and/or bearer information.

In an example embodiment, the mode switching message may contain the resource configuration information for the D2D communication between the first UE and the second UE.

In an example embodiment, the sent mode switching message may contain D2D communication/cellular communication bearer establishment information, which is used for establishing the D2D communication/cellular communication bearer between the first UE and the second UE.

In an example embodiment, the sent mode switching message may contain updated TFT information.

In an example embodiment, the mode switching message may be born by proprietary signalling or RRC reconfiguration signalling and other existing air interface signalling;

the first UE performs the mode switching according to the indication information in the mode switching message further includes:

the first UE judges whether to establish or modify the corresponding cellular communication/D2D communication data bearer or not according to the switched D2D communication/cellular communication data stream and/or bearer information indicated by the mode switching message; and when the first UE has yet not established the corresponding cellular communication/D2D communication data bearer, the corresponding communication data bearer is established;

when the corresponding bearer has been established and the updated TFT information has been acquired, the first UE switches the D2D communication/cellular communication data stream and/or bearer indicated by the mode switching message to the corresponding bearer for communication; and when the first UE is required to modify the corresponding cellular communication/D2D communication data bearer, data bearer modification is initiated.

Furthermore, the cellular communication data bearer/D2D communication data bearer includes configuration information of PDCP, RLC and MAC entities and logic channels.

In an example embodiment, the first UE sends a mode switching completion message to the first eNB.

Optionally, the first UE initiates to release the D2D communication/cellular communication data bearer indicated by the mode switching message.

In an example embodiment, the corresponding communication data bearer is established when the first UE has yet not established the corresponding cellular communication/D2D communication data bearer further includes:

as to the mode switching from the cellular communication to the D2D communication, the first UE establishes the D2D communication data bearer with the second UE through the first eNB or directly, and updates the TFT information; and as to the mode switching from the D2D communication to the cellular communication, when the cellular communication data bearer has yet not established between the first UE and the second UE, the first UE requests to establish the cellular communication data bearer, and updates the TFT information.

In an example embodiment, the first UE switches the D2D communication/cellular communication data stream and/or bearer indicated by the mode switching message for communication further includes:

as to the mode switching from cellular communication to D2D communication, the first UE implements D2D communication according to the data stream, indicated by the mode switching message, of the first UE and the second UE through the D2D communication data bearer by virtue of D2D communication resources, which are scheduled by the first eNB or for which are competed by the first UE, of the first eNB; and as to the mode switching from the D2D communication to the cellular communication, the first UE implements the cellular communication according to the data stream indicated by the mode switching information, of the first UE and the second UE through the cellular communication data bearer by virtue of cellular communication resources, which are scheduled by the first eNB schedules.

In an example embodiment, after the first UE sends the mode switching completion message to the first eNB, the method further includes:

the first eNB receives the mode switching completion message, and optionally, the first eNB initiates releasing or modification of the switched D2D communication/cellular communication data bearer.

Example Embodiment 2

No matter switching from a cellular communication mode to a D2D communication mode or switching from the D2D communication mode to the cellular communication mode, a system requires to avoid users perceiving mode switching in a process of the mode switching under the control of a network infrastructure, thereby ensuring service continuity. For such a requirement, the disclosure provides an equipment mode switching method for a D2D system. Specifically, as shown in FIG. 2, first UE receives a mode switching message, and then the first UE performs the mode switching according to indication information in the mode switching message. By the method provided by the disclosure, the network infrastructure may require a UE to be flexibly switched between the cellular communication mode and the D2D communication mode according to a load condition of the UE and ensure service continuity to implement an improvement in overall throughput of the system.

Embodiment 1

The embodiment provides a method for mode switching of a UE in a scenario with a network coverage. A characteristic of the embodiment is that the UE which performs the mode switching is covered by the same eNB. In order to implement the mode switching, signalling interaction between the UE and the eNB and between the eNB and a core network element includes the following basic flow.

Figure 9:
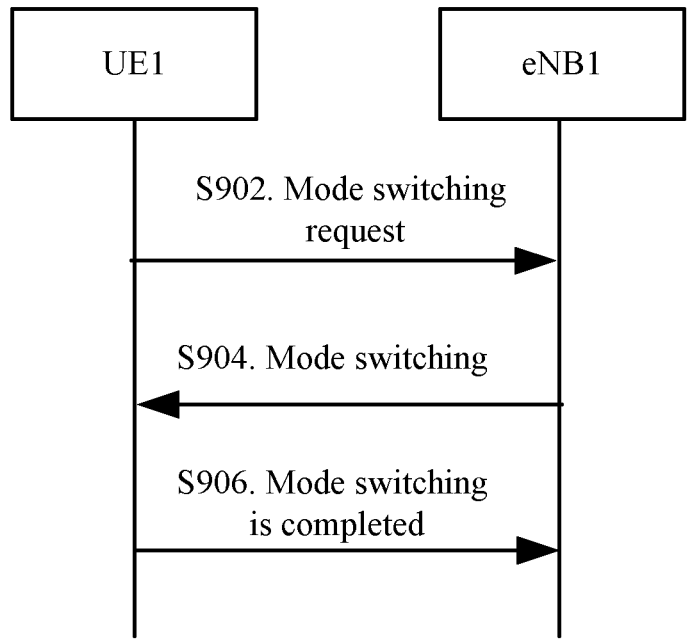
FIG. 9 is an air interface flowchart of mode switching initiated by a UE according to an embodiment of the disclosure.

As shown in FIG. 9, an air interface flow of mode switching initiated by the UE includes the following steps:

Step 902: a UE1 sends a mode switching request message to an eNB1.

Step 904: eNB1 judges whether the UE1 meets a condition of the mode switching or not after receiving the mode switching request message, and sends a mode switching message to the UE1 when the UE1 meets the condition of the mode switching.

Step 906: the UE1 performs the mode switching after receiving the mode switching message, and sends a mode switching completion message to the eNB1 after completing the mode switching.

Figure 10:
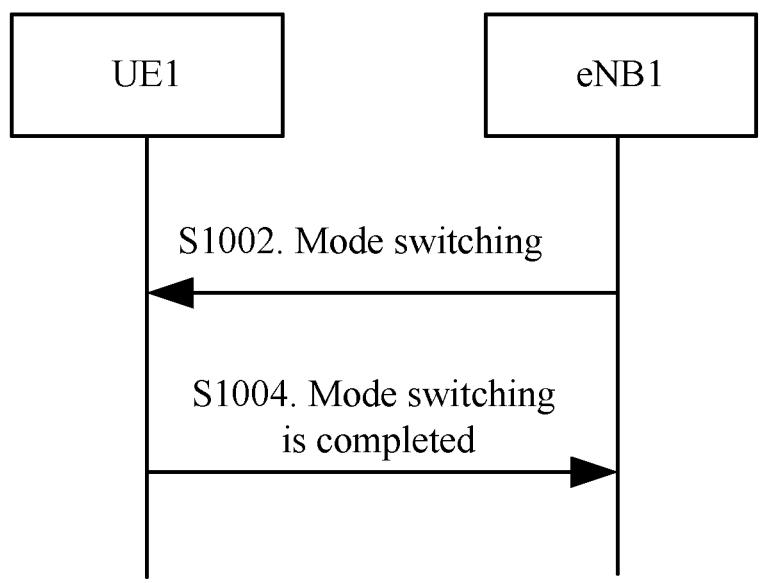
FIG. 10 is an air interface flowchart of mode switching initiated by an eNB according to an embodiment of the disclosure.

In the embodiment, an air interface flow of the mode switching initiated by the eNB, as shown in FIG. 10, includes the following Step 1002 to Step 1004.

Step 1002: the eNB1 sends the mode switching message to the UE1.

Step 1004: the UE1 performs mode switching after receiving the mode switching message, and sends the mode switching completion message to the eNB1 after completing the mode switching.

Figure 11:
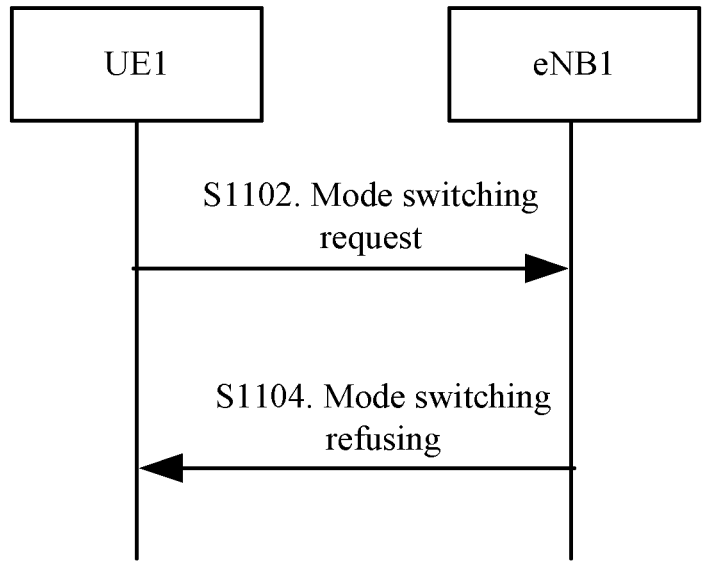
FIG. 11 is an air interface flowchart of failing of mode switching initiated by UE according to an embodiment of the disclosure.

In the embodiment, an air interface flow of failing of mode switching initiated by a UE, as shown in FIG. 11, includes the following steps 1102 to Step 1104.

Step 1102: the UE1 sends the mode switching request message to the eNB1.

Step 1104: the eNB1 judges whether the UE1 meets the condition of the mode switching or not after receiving the message, and sends a mode switching refusing message to the UE1 when UE1 does not meet the condition of the mode switching.

Figure 12:
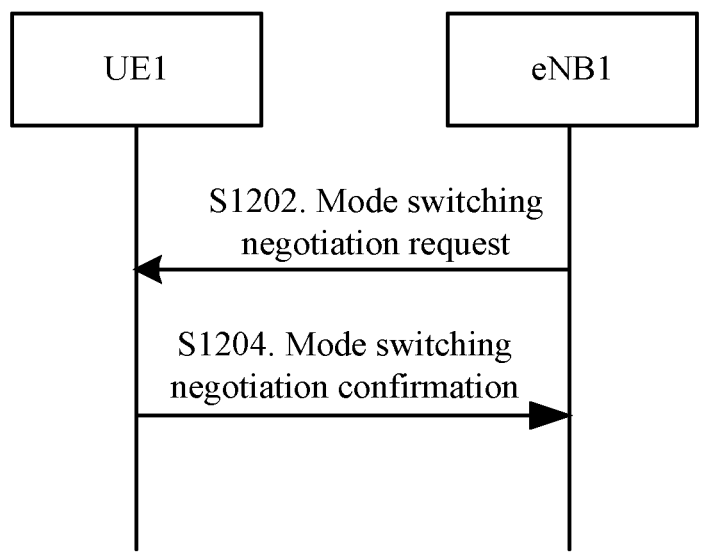
FIG. 12 is an air interface flowchart of negotiation about mode switching initiated by an eNB according to an embodiment of the disclosure.

In the embodiment, an air interface flow of mode switching negotiation initiated by an eNB, as shown in FIG. 12, includes the following Step 1202 to Step 1204.

Step 1202: the eNB1 sends a mode switching negotiation request to the UE1.

Step 1204: the UE1 judges whether the mode switching condition is met or not, and sends a mode switching negotiation confirmation message to the eNB1 when the condition of the mode switching is met.

Figure 13:
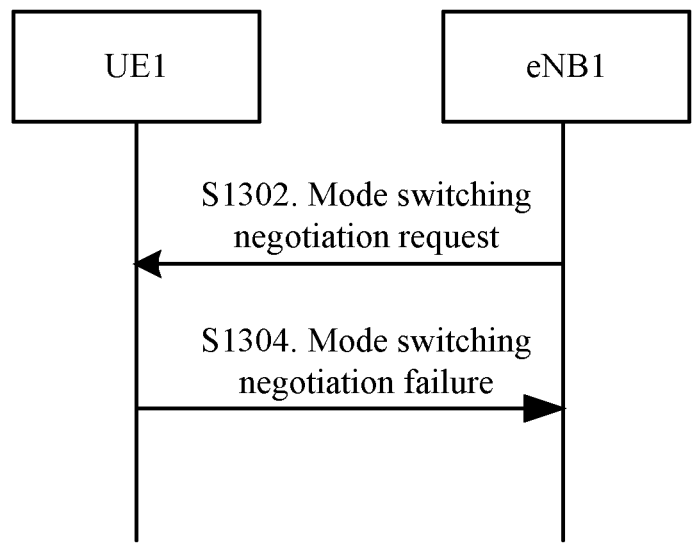
FIG. 13 is an air interface flowchart of failing of negotiation about mode switching initiated by an eNB according to an embodiment of the disclosure.

In the embodiment, an air interface flow of failing of mode switching negotiation initiated by an eNB, as shown in FIG. 13, includes the following Step 1302 to Step 1304.

Step 1302: the eNB1 sends the mode switching negotiation request to the UE1.

Step 1304: the UE1 judges whether the condition of the mode switching is met or not, and sends a mode switching negotiation failure message to the eNB1 when the condition of the mode switching is not met.

Figure 14:
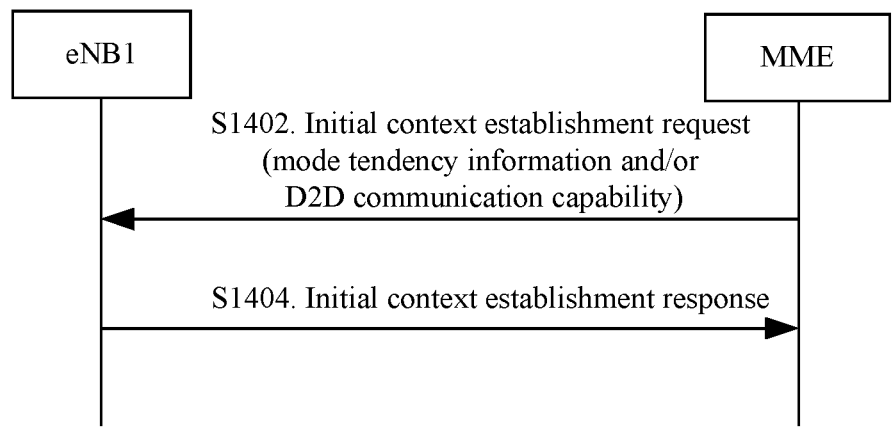
FIG. 14 is a flowchart of acquiring mode tendency and D2D communication capability information through a context of a UE by an eNB according to an embodiment of the disclosure.
Figure 15:
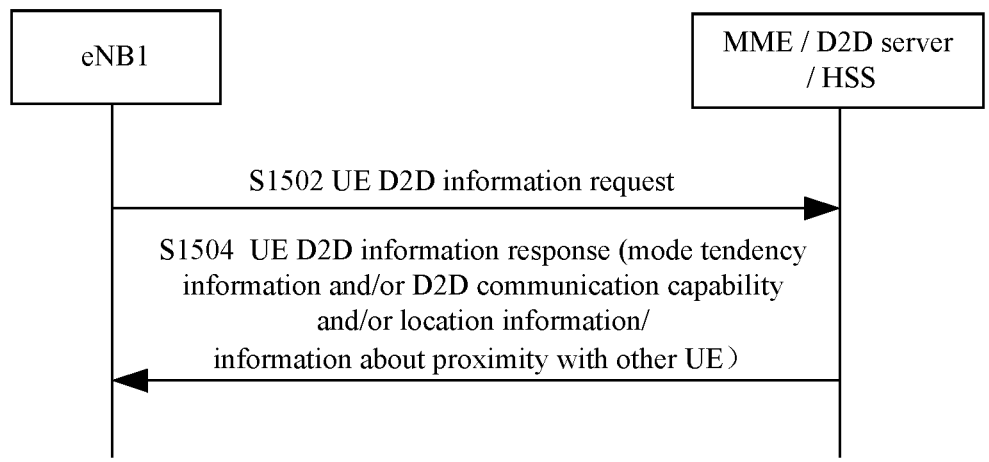
FIG. 15 is a flowchart of acquiring D2D related information of a UE from an MME/ProSe function or an HSS by an eNB according to an embodiment of the disclosure.

In an example embodiment, when the eNB performs UE mode switching judgment, it is usually necessary to acquire UE D2D attribute information, such as a mode tendency, a D2D communication capability, location information of a UE node pair which performs mode switching or information about whether the UE node pair is proximal or not, and an acquisition flow of the information is shown in FIG. 14 and FIG. 15.

FIG. 14 is a flowchart of acquiring mode tendency and D2D communication capability information through a context of a UE by an eNB according to an embodiment of the disclosure, and as shown in FIG. 14, the flow includes the following Step 1402 and Step 1404.

Step 1402: an MME sends an initial context establishment request message to the eNB, the message including a context of the UE and the context of the UE including information of a mode tendency, D2D communication capability and the like of the UE.

Step 1404: the eNB sends an initial context establishment response message to the MME after receiving the message.

FIG. 15 is a flowchart of acquiring D2D related information of a UE from an MME/ProSe function or an HSS by an eNB according to an embodiment of the disclosure, wherein the eNB executes the following Step 1502 and Step 1504 when the UE initially accesses, or the UE requests to perform mode switching or the eNB actively initiates mode switching detection.

Step 1502: the eNB sends a UE D2D communication information request message to the MME or a ProSe function or an HSS, the message optionally indicating a required mode type.

Step 1504: the MME or the ProSe function or the HSS sends a UE D2D communication information response message to the eNB after receiving the message, wherein the response message may include the mode tendency of the UE, a D2D discovery blacklist and white list, the D2D communication capability, the location information of the UE node pair which performs the mode switching or the information about whether the UE node pair is geographically proximal or not.

Figure 16:
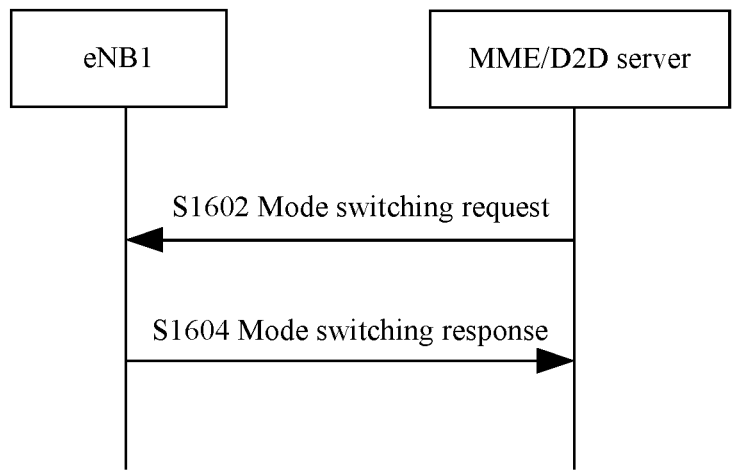
FIG. 16 is a flowchart of requesting an MME/ProSe function to perform mode switching judgment by an eNB according to an embodiment of the disclosure.

When the eNB cannot directly acquire the UE D2D attribute information, the eNB is required to request the MME/ProSe function which has a capability of acquiring or stores the UE D2D attribute information to perform mode switching judgment for the mode switching judgment of the UE, and the flow, as shown in FIG. 16, includes the following Step 1602 and Step 1604.

Step 1602: the eNB sends a mode switching request message to the MME/ProSe function.

Step 1604: the MME/ProSe function judges whether the related UE meets the mode switching condition or not after receiving the message, sends a mode switching response message to the eNB when the related UE meets the condition of the mode switching, otherwise sends a mode switching refusing message to the eNB.

In an example embodiment, a part of UE D2D attributes such as the mode tendency and the D2D communication capability may be acquired by the eNB according to the flow shown in FIG. 15, and the other part of UE D2D attributes such as the D2D discovery blacklist and white list, the location information of the UE node pair or the information about whether the UE node pair is proximal or not may not be acquired by the eNB, and are required to be relatively judged by the MME/ProSe function according to the flow shown in FIG. 16.

The mode switching method for the D2D system is described below with example 1 to example 7 in detail.

EXAMPLE 1

Figure 17:
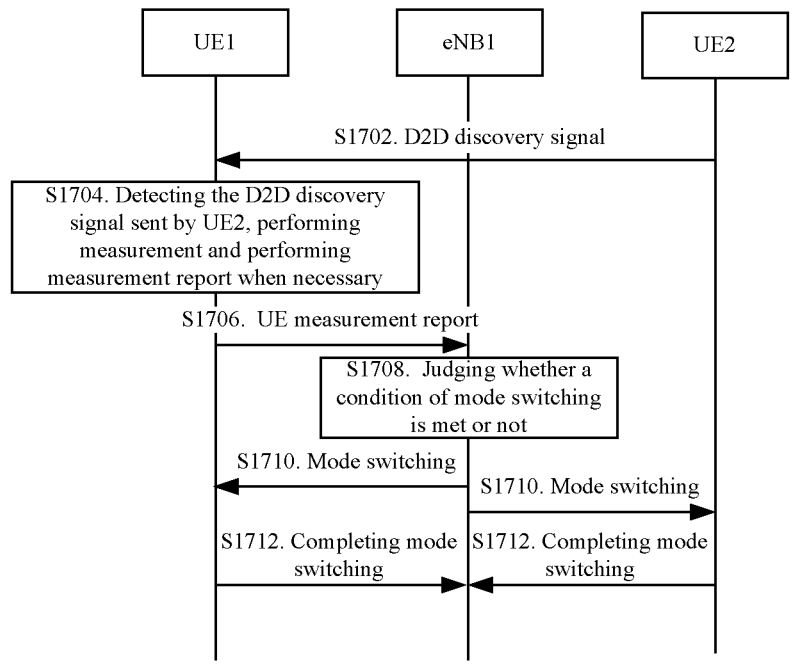
FIG. 17 is a flowchart of mode switching in example 1 according to an embodiment of the disclosure.

In a scenario with a network infrastructure coverage, a UE1 and a UE2 have D2D discovery and D2D communication capabilities and enable a D2D function. Data session communication is established between the UE1 and the UE2, and a data stream may be forwarded through an infrastructure of a cellular network. Along with gradual movement of the UE1 to a surrounding area of the UE2, the UE1 may detect a discovery signal sent by the UE2. Along with gradual reduction of a distance between the UE1 and the UE2, the discovery signal detected by the UE1 and sent by the UE2 gets stronger and stronger, and exceeds a set measurement report threshold, and then the UE1 sends a measurement report message to a serving eNB eNB1. FIG. 17 is a flowchart of mode switching in example 1 according to an embodiment of the disclosure, and as shown in FIG. 17, the flow includes the following steps:

Step 1702: the UE2 sends a D2D discovery signal to the UE1.

Step 1704: the UE1 detects the D2D discovery signal sent by the UE2, performs measurement, and performs measurement report when necessary. A measurement report message may include an identifier of UE2, a signal measurement result, obtained by UE1, of UE2, a signal measurement result, obtained by UE1, of a serving eNB, an indication about cellular communication between the UE1 and the UE2, bearer information corresponding to data stream of a cellular communication between UE1 and UE2, quality of service information corresponding to data stream and/or bearer of the cellular communication between the UE1 and the UE2 and an indication about whether a corresponding D2D communication data bearer is established between the UE1 and the UE2 or not and/or the D2D communication data bearer is required to be established between the UE1 and the UE2. In addition, the measurement report message may further include a mode switching type and information of a serving eNB of the UE2, wherein the mode switching type indicates switching from a cellular communication mode to a D2D communication mode.

Step 1706: the UE1 sends a measurement report to the eNB1.

Step 1708: the eNB1 judges whether a condition of the mode switching is met or not after receiving the measurement report of the UE1. For example: when signal quality of UE2 in the measurement report is high enough, a judgment about whether UE1 meets a condition of switching from the cellular communication mode to the D2D communication mode or not is further triggered according to that mode tendency information, acquired from a core network element, of the UE1 indicates that the D2D communication mode is preferably adopted on a UE level (preferably on the UE level).

Step 1710: the eNB1 controls the mode switching.

The eNB1 judges whether the UE1 meets the condition of switching from the cellular communication mode to the D2D communication mode or not includes: the eNB1 judges whether the UE1 supports a D2D communication function or not, the eNB1 judges whether the UE1 performs the cellular data communication with the UE2 or not, the eNB1 judges whether the UE1 is proximal to the UE2 or not and the eNB1 judges whether there are enough D2D communication air interface resources for the D2D communication between the UE1 and the UE2 or not is judged.

The eNB1 determines that the UE1 supports the D2D communication function according to UE D2D attribute information acquired from an MME/ProSe function or an HSS.

The eNB1 may determine that the UE1 is being performing cellular data communication with UE2 according to the indication about cellular communication between the UE1 and the UE2 in the measurement report message.

The eNB1 determines that the UE1 meets a link quality threshold of D2D communication with the UE2 according to the measurement report of the UE1, thereby determining that the UE1 is proximal to the UE2.

The eNB1 judges whether there are enough D2D communication resources supporting corresponding D2D communication or not according to the bearer information corresponding to data stream of the cellular communication between the UE1 and the UE2 and the quality of service information corresponding to data stream and/or bearer of the cellular communication between the UE1 and the UE2. When the D2D air interface resources may support all or a part of data stream of the cellular communication between the UE1 and the UE2, the eNB1 determines that there are enough D2D communication air interface resources for the D2D communication between the UE1 and the UE2.

Then eNB1 determines the serving eNB of the UE2, and an acquisition method for the serving eNB of the UE2 is beyond the scope of protection of the disclosure. In the example, the serving eNB of the UE2 is eNB1, and the eNB1 continues judging whether the UE2 meets the condition of the mode switching or not, specifically including: the eNB1 judges whether the UE2 supports the D2D communication function or not, and the eNB1 learns about that the UE2 supports the D2D communication function according to the UE D2D attribute information acquired from the MME/ProSe server or the HSS.

Step 1712: the UE1 and the UE2 complete the mode switching.

In the case that both the UE1 and the UE2 meet the condition of the mode switching, the eNB1 sends a mode switching message to the UE1 and the UE2. The mode switching message includes the identifiers of a UE required to perform mode switching communication of the eNB1 and switched cellular communication data stream and/or bearer information. In addition, the mode switching message may include resource configuration information for the D2D communication between the UE1 and the UE2 and a scenario where eNB1 allocates proprietary resources or proprietary resource pools to the UE1 and the UE2 for the D2D communication. When the UE1 and the UE2 have yet not established the D2D communication data bearer or the measurement report message includes the indication about that the D2D communication data bearer is required to be established, the mode switching message may further contain D2D communication bearer establishment information, which is used for establishing the D2D communication bearer between the UE1 and the UE2. In addition, the mode switching message may contain updated TFT information, which is used for updating and mapping original cellular communication data stream between the UE1 and the UE2 from cellular data bearer to D2D data bearer. Here, the mode switching message may be born by new designed air interface signalling or RRC reconfiguration signalling and other existing air interface signalling.

The UE1 and the UE2 judge whether to establish the corresponding D2D communication data bearer or not according to the to-be-switched cellular communication data stream and/or bearer information indicated by the mode switching message. When the corresponding bearer has been established and the updated TFT information has been acquired, the UE1 and the UE2 switch the cellular communication data stream indicated by the mode switching message to the corresponding D2D communication data bearer. As to the mode switching from cellular communication to D2D communication, the UE1 performs D2D communication with the UE2 by virtue of the D2D communication resource configured in the mode switching message by eNB1.

The UE1 and the UE2 optionally send mode switching completion messages to eNB1 after completing mode switching. The eNB1 may initiate releasing or modification of the switched cellular communication data bearer after receiving the mode switching completion messages of the UE1 and the UE2. At this point, mode switching of the UE1 and the UE2 from the cellular communication mode to the D2D communication mode is completed.

EXAMPLE 2

Figure 18:
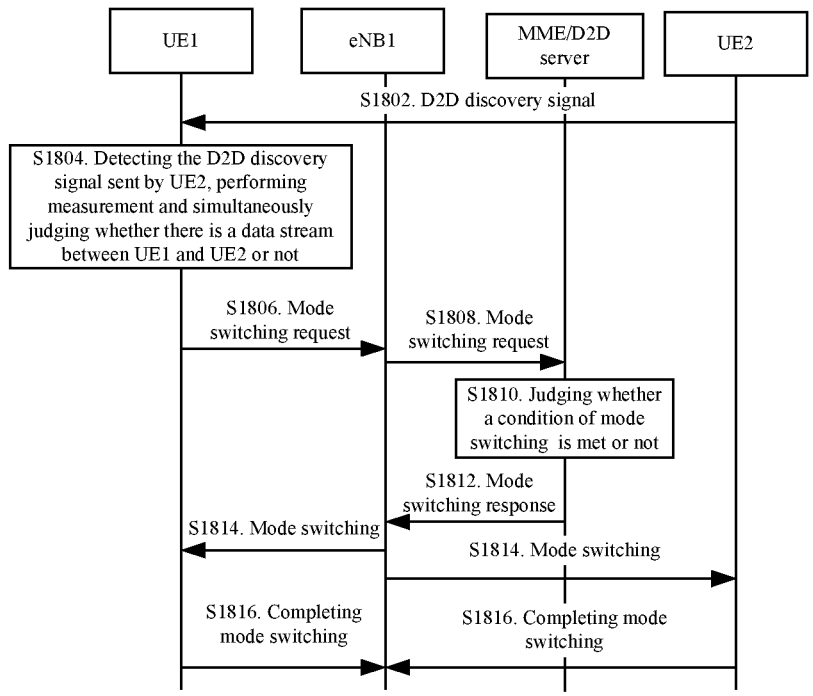
FIG. 18 is a flowchart of mode switching in example 2 according to an embodiment of the disclosure.

In a scenario with a network infrastructure coverage, a UE1 and a UE2 have D2D discovery and D2D communication capabilities and enable a D2D function. Data session communication is established between the UE1 and the UE2, and a data stream may be forwarded through an infrastructure of a cellular network. Along with gradual movement of the UE1 to a surrounding area of the UE2, the UE1 may detect a discovery signal sent by the UE2. Along with gradual reduction of a distance between the UE1 and the UE2, the discovery signal detected by the UE1 and sent by the UE2 gets stronger and stronger. At the same time, the UE1 determines existence of a cellular communication data stream between the UE1 and the UE2. The UE1 sends a mode switching request message to a serving eNB eNB1. FIG. 18 is a flowchart of mode switching in example 2 according to an embodiment of the disclosure, and as shown in FIG. 18, the flow includes Step 1802 to Step 1816.

Step 1802: the UE2 sends a D2D discovery signal to the UE1.

Step 1804: the UE1 detects the D2D discovery signal sent by the UE2, performs measurement, and simultaneously judges whether there is a data stream between the UE1 and the UE2.

Step 1806: a mode switching request message is sent.

The mode switching request message may include an identifier of the UE2, a signal measurement result, obtained by the UE1, of the UE2, an indication about cellular communication between the UE1 and the UE2, bearer information corresponding to a cellular communication data stream between the UE1 and the UE2, quality of service information corresponding to the cellular communication data stream and/or bearer between UE1 and UE2 and an indication about whether a corresponding D2D communication data bearer is established between the UE1 and the UE2 or not and/or the D2D communication data bearer is required to be established between the UE1 and the UE2. In addition, the mode switching request message may further include a mode switching type and information of a serving eNB of the UE2, wherein the mode switching type indicates switching from a cellular communication mode to a D2D communication mode.

Step 1808: the eNB1 sends the mode switching request message to an MME/ProSe function.

The eNB1 sends the mode switching request message to the MME or the ProSe function after receiving the mode switching request message of the UE1. The mode switching request message sent to the MME or the ProSe function by the eNB1 may include at least one of the followings: identifiers of the UE1 and the UE2, the signal measurement result, obtained by the UE1, of the UE2, the indication about cellular communication between the UE1 and the UE2, the bearer information corresponding to the cellular communication data stream between the UE1 and the UE2, the quality of service information corresponding to data stream and/or bearer of the cellular communication between the UE1 and the UE2 and the indication about whether the corresponding D2D communication data bearer is established between the UE1 and the UE2 or not and/or the D2D communication data bearer is required to be established between the UE1 and the UE2. In addition, the measurement report message may further include the mode switching type and the information of the serving eNB of UE2, wherein the mode switching type indicates switching from the cellular communication mode to the D2D communication mode.

Step 1810: whether a mode switching condition is met or not is judged.

The MME or the ProSe function receives the mode switching request message, and judges whether the condition of the mode switching is met or not. The MME or the ProSe function judges whether the UE1 and the UE2 meet a condition of switching from the cellular communication mode to the D2D communication mode includes whether the UE1 supports the D2D communication function or not is judged. In addition, the MME or the ProSe function may further provide information for judging whether the UE1 is proximal to the UE2 or not.

The MME or the ProSe function directly judges whether the UE1 and the UE2 support D2D communication or not when storing D2D communication capability information of the UE. Otherwise, the MME or the ProSe function acquires UE D2D attribute information from the HSS, and judges whether the UE1 and the UE2 meets the condition of supporting D2D communication or not.

Step 1812: a mode switching response message is sent.

In the case that the UE1 and the UE2 both have the D2D communication capability, the MME or the ProSe function sends the mode switching response message to the eNB1. After the eNB1 receives the mode switching response message, the EnB1 further judges whether the UE1 is proximal to the UE2 or not and whether there are enough D2D communication resources for the D2D communication between the UE1 and the UE2 or not.

The eNB1 judges whether the UE1 meets a link quality threshold of the D2D communication with the UE2 according to discovery signal measurement in the mode switching request sent by the UE1, thereby determining that the UE1 is proximal to the UE2. In addition, the MME or the ProSe function may acquire geographical location information or distance information of the UE1 and the UE2 from a location server, judges whether a distance between the UE1 and the UE2 meets a D2D communication distance threshold or not, and when the distance meets the D2D communication distance threshold, determines that the UE1 is proximal to the UE2, and sends the information to the eNB1 through the mode switching response message.

The eNB1 may perform packet header detection on a communication data packet of the UE served by the eNB1, and judges whether the UE1 performs the cellular communication with the UE2 served or not according to source and destination addresses. Then the eNB1 judges whether there are enough D2D communication resources supporting corresponding D2D communication or not according to the bearer information corresponding to the cellular communication data stream between the UE1 and the UE2 and the quality of service information corresponding to data stream and/or bearer of the cellular communication between the UE1 and the UE2. When the D2D air interface resources may support all or a part of data streams of the cellular communication between the UE1 and the UE2, the eNB1 determines that there are enough D2D communication air interface resources for the D2D communication between the UE1 and the UE2.

Step 1814: the mode switching is performed.

In the case that all the conditions are met, the eNB1 determines that the UE1 meets the mode switching condition, and sends the mode switching message to the UE1 and the UE2. The mode switching message includes the identifiers of a UE required to perform the mode switching communication of the eNB1 and switched cellular communication data stream and/or bearer information. In addition, the mode switching message may include resource configuration information for the D2D communication between the UE1 and the UE2 and a scenario where the eNB1 and/or the ProSe function allocate(s) proprietary resources or proprietary resource pools to the UE1 and the UE2 for the D2D communication. When the UE1 and the UE2 have yet not established the D2D communication data bearer or a measurement report message includes the indication about that the D2D communication data bearer is required to be established, the mode switching message may further contain D2D communication bearer establishment information, which is used for establishing the D2D communication bearer between the UE1 and the UE2. In addition, the mode switching message may contain updated TFT information, configured to update and map original cellular communication data stream between the UE1 and the UE2 from the cellular data bearer to the D2D data bearer. Here, the mode switching message may be born by new designed air interface signalling or RRC reconfiguration signalling and other existing air interface signalling.

The UE1 and the UE2 judge whether to establish the corresponding D2D communication data bearer or not according to the to-be-switched cellular communication data stream and/or bearer information indicated by the mode switching message. When the corresponding bearer has not been established, the UE1 and the UE2 establish the D2D communication data bearer through the eNB1 or directly, update the TFT information, and then switch the cellular communication data stream indicated by the mode switching message to the corresponding D2D communication data bearer, and the UE1 performs the D2D communication with the UE2 by virtue of the D2D communication resource configured in the mode switching message by the eNB1.

Step 1816: the mode switching is completed.

The UE1 and the UE2 optionally send mode switching completion messages to the eNB1 after completing mode switching. The eNB1 may initiate releasing or modification of the switched cellular communication data bearer after receiving the mode switching completion messages of the UE1 and the UE2. At this point, mode switching of the UE1 and the UE2 from the cellular communication mode to the D2D communication mode is completed.

In the example, the eNB1 is responsible for judging whether the UE1 is proximal to the UE2 or not and whether there are enough air interface resources for the D2D communication between the UE1 and the UE2 or not. The MME and the ProSe function are responsible for judging whether the UE1 and the UE2 have the D2D communication capability or not. Optionally, the MME and the ProSe function may also judge whether the UE1 is proximal to the UE2 or not, and under such a condition, the eNB1 is only required to judge whether there are enough air interface resources for the D2D communication between the UE1 and the UE2 or not. Or, the MME and the ProSe function judge whether the UE1 and the UE2 have the D2D communication capability or not, whether the UE1 is proximal to the UE2 or not and whether there are enough air interface resources for the D2D communication between the UE1 and the UE2 or not, and under such a condition, the eNB2 is only required to forward the mode switching request message. Or, the MME and the ProSe function judge whether the UE1 is proximal to the UE2 or not, and the eNB1 is responsible for judging whether the UE1 and the UE2 have the D2D communication capability or not and whether there are enough air interface resources for the D2D communication between the UE1 and the UE2 or not.

EXAMPLE 3

In a scenario with a network infrastructure coverage, the UE1 and the UE2 have D2D discovery and D2D communication capabilities and enable a D2D function. Data session communication is established between the UE1 and the UE2, and communication of a data stream is implemented through a D2D communication bearer. When the UE1 gradually gets far away from a surrounding area of the UE2, the UE1 detects that intensity of a discovery signal sent by the UE2 is gradually reduced to be smaller than a given threshold. At the same time, the UE1 determines existence of a D2D communication data stream between the UE1 and the UE2. The UE1 sends a mode switching request message to a serving eNB eNB1.

Figure 19:
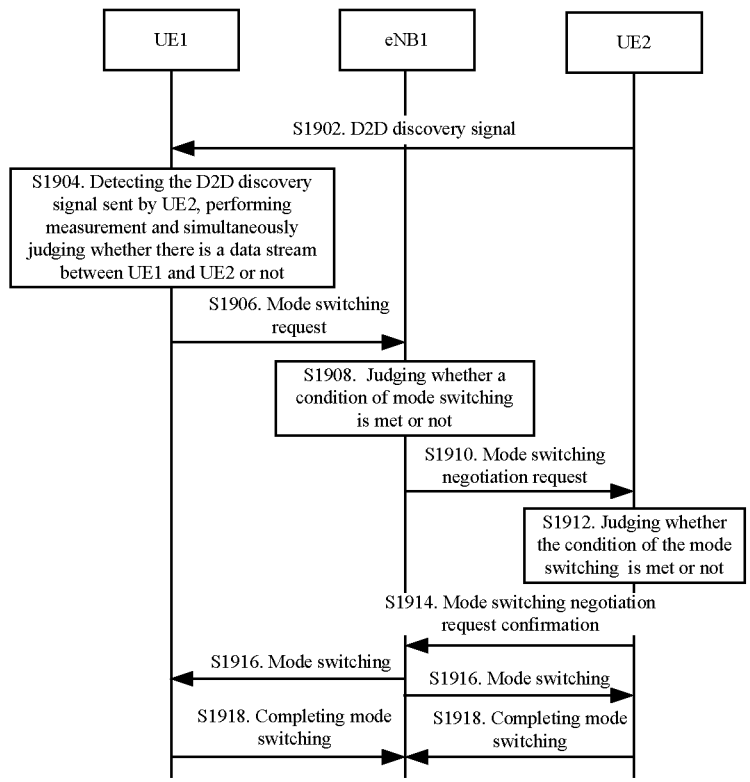
FIG. 19 is a flowchart of mode switching in example 3 according to an embodiment of the disclosure.

FIG. 19 is a flowchart of mode switching in example 3 according to an embodiment of the disclosure, and as shown in FIG. 19, the flow includes Step 1902 to Step 1918.

Step 1902: the UE2 sends a D2D discovery signal to the UE1.

Step 1904: the UE1 detects the D2D discovery signal sent by the UE2, performs measurement, and simultaneously judges whether there is a data stream between the UE1 and the UE2.

Step 1906: a mode switching request message is sent.

The mode switching request message includes at least one of the followings: an identifier of UE2, a signal measurement result, obtained by the UE1, of the UE2, a measurement result, obtained by UE1, of a serving eNB, an indication about the D2D communication between the UE1 and the UE2, bearer information corresponding to a D2D communication data stream between the UE1 and the UE2, quality of service information corresponding to data stream and/or bearer of the D2D communication between the UE1 and the UE2 and an indication about whether a corresponding cellular communication data bearer is established between the UE1 and the UE2 or not and/or the cellular communication data bearer is required to be established between the UE1 and the UE2. In addition, the mode switching request message may further include a mode switching type and information of a serving eNB of the UE2, wherein the mode switching type indicates switching from a D2D communication mode to a cellular communication mode.

Step 1908: the eNB1 judges whether a mode switching condition is met or not.

The eNB1 discovers that quality of the discovery signal of the UE2 in a measurement report is worsened and an allocated D2D communication resource cannot meet a requirement on quality of service of the data stream and/or bearer between the UE1 and the UE2 after receiving the mode switching request message, and then a judgment about whether the UE1 meets a condition of switching from the D2D communication mode to the cellular communication mode or not is triggered.

The eNB1 judges whether the UE1 meets the condition of switching from the D2D communication mode to the cellular communication mode includes: the eNB1 judges whether the UE1 performs the D2D data communication with the UE2 or not and the eNB1 judges whether there are enough cellular communication air interface and backbone link resources or not.

The eNB1 may judge that the UE1 is being performing the D2D data communication with the UE2 according to the indication about the D2D communication between the UE1 and the UE2 in the mode switching request message. In addition, the eNB1 may learn about whether the UE1 performs the D2D communication with the UE2 or not according to stored context information of the UE1, and in addition, the eNB1 may also acquire related information about whether the UE1 performs the D2D communication with the UE2 or not from another network side entity.

The eNB1 judges whether there are enough cellular communication air interface and backbone link resources supporting corresponding cellular communication or not according to the bearer information corresponding to data stream of the D2D communication between the UE1 and the UE2 and the quality of service information corresponding to data stream and/or bearer of the D2D communication between the UE1 and the UE2. When the cellular communication air interface and backbone link resources may support all or a part of data stream of the cellular communication between the UE1 and the UE2, it is determined that a condition that there are enough cellular communication air interface and backbone link resources for cellular communication between the UE1 and the UE2, otherwise the condition is not met.

Step 1910: a mode switching negotiation request is sent.

The eNB1 determines the serving eNB of the UE2, and an acquisition method for the serving eNB of the UE2 is beyond the scope of protection of the disclosure. In the example, the serving eNB of the UE2 is the eNB1, and the eNB1 continues judging whether the UE2 meets the mode switching condition or no. The eNB1 sends the mode switching negotiation request to the UE2. The mode switching negotiation request message may contain one of the followings: an identifier of the UE1, the bearer information corresponding to data stream of the D2D communication between the UE1 and the UE2 and the quality of service information corresponding to data stream and/or bearer of the D2D communication between the UE1 and the UE2. In addition, the mode switching negotiation request message may explicitly include a mode switching type indicating switching from the D2D communication to the cellular communication.

Step 1912: whether the condition of the mode switching is met or not is judged.

The UE2 receives the mode switching negotiation request message, and judges whether the condition of the mode switching is met or not.

Step 1914: when the condition of the mode switching is met, a mode switching negotiation request confirmation message is sent, otherwise a mode switching negotiation failure message is sent, the mode switching negotiation failure message including a failure reason indication. The mode switching negotiation request confirmation message may include at least one of the followings: the identifier of the UE1, bearer information corresponding to a cellular communication data stream supported by UE2 between UE1 and UE2 and quality of service information corresponding to the cellular communication data stream and/or bearer supported by the UE2 between the UE1 and the UE2. In addition, the mode switching negotiation request confirmation message may further include the following information: bearer information corresponding to a cellular communication data stream which is not supported by the UE2 between the UE1 and the UE2 and quality of service information corresponding to the cellular communication data stream and/or bearer which is not supported by the UE2 between the UE1 and the UE2. When the eNB1 receives the mode switching negotiation request confirmation message, it is determined that the UE2 meets the condition of the mode switching.

Then the eNB1 sends a mode switching message to the UE1 and the UE2. The mode switching message includes the identifiers of the UE required to perform mode switching communication of the eNB1 and switched D2D communication data stream and/or bearer information. When the UE1 and the UE2 have yet not established the cellular communication data bearer or a measurement report message includes the indication about that the cellular communication data bearer is required to be established, the mode switching message may further contain cellular communication bearer establishment information, which is used for establishing the cellular communication bearer between the UE1 and the UE2. Here, the mode switching message may be born by new designed air interface signalling or RRC reconfiguration signalling and other existing air interface signalling.

Step 1916: the UE1 and the UE2 judge whether to establish the corresponding cellular communication data bearer or not according to the to-be-switched cellular communication data stream and/or bearer information indicated by the mode switching message. When the corresponding bearer has not been established or the bearer is required to be modified, the UE1 and/or the UE2 establish(es) or modify/modifies the D2D communication data bearer through the eNB1 or directly, update(s) TFT information, and then switch(es) the D2D communication data stream indicated by the mode switching message to the corresponding D2D communication data bearer, and the UE1 performs the cellular communication with the UE2 according to scheduling of the eNB1.

Step 1918: the UE1 and the UE2 optionally send mode switching completion messages to eNB1 after completing mode switching. The eNB1 may initiate releasing or modification of the switched D2D communication data bearer after receiving the mode switching completion messages of the UE1 and the UE2. At this point, the mode switching of the UE1 and the UE2 from the D2D communication mode to the cellular communication mode is completed.

EXAMPLE 4

Figure 20:
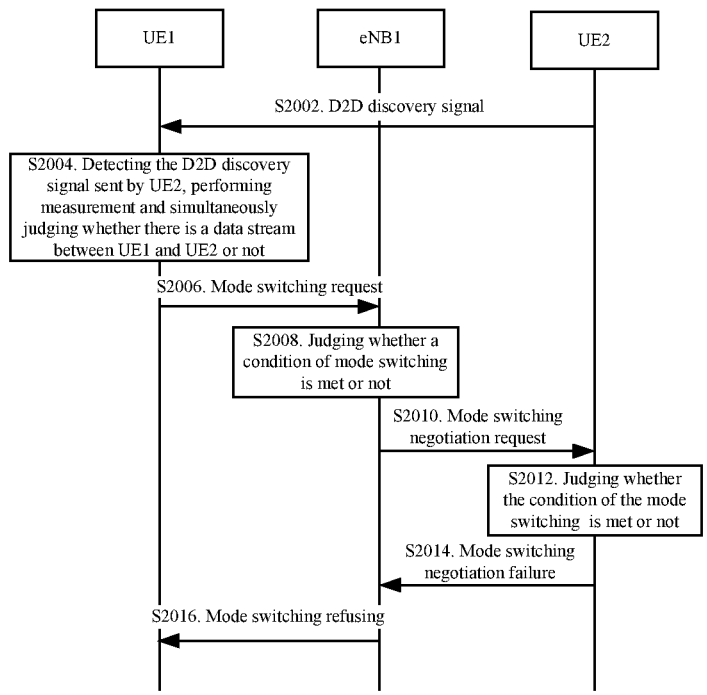
FIG. 20 is a flowchart of mode switching in example 4 according to an embodiment of the disclosure.

In a scenario with a network infrastructure coverage, the UE1 and the UE2 have D2D discovery and D2D communication capabilities and enable a D2D function. Data session communication is established between the UE1 and the UE2, and a data stream may be forwarded through an infrastructure of a cellular network. Along with gradual movement of the UE1 to a surrounding area of the UE2, the UE1 may detect a discovery signal sent by the UE2. Along with gradual reduction of a distance between the UE1 and the UE2, the discovery signal detected by the UE1 and sent by the UE2 gets stronger and stronger. At the same time, the UE1 determines existence of a cellular communication data stream between the UE1 and the UE2. The UE1 sends a mode switching request message to a serving eNB eNB1. FIG. 20 is a flowchart of mode switching in example 4 according to an embodiment of the disclosure, and as shown in FIG. 20, the flow includes Step 2002 to Step 2016.

Step 2002: the UE2 sends a D2D discovery signal to the UE1.

Step 2004: the UE1 detects the D2D discovery signal sent by UE2, performs measurement, and simultaneously judges whether there is a data stream between the UE1 and the UE2.

Step 2006: a mode switching request message is sent.

The mode switching request message may include an identifier of the UE2, a signal measurement result, obtained by the UE1, of the UE2, an indication about cellular communication between the UE1 and the UE2, bearer information corresponding to data stream of a cellular communication between the UE1 and the UE2, quality of service information corresponding to data stream and/or bearer of the cellular communication between the UE1 and the UE2 and an indication about whether a corresponding D2D communication data bearer is established between the UE1 and the UE2 or not and/or the D2D communication data bearer is required to be established between the UE1 and the UE2. In addition, the mode switching request message may further include a mode switching type and information of a serving eNB of the UE2, wherein the mode switching type indicates switching from a cellular communication mode to a D2D communication mode.

Step 2008: whether a mode switching condition is met or not is judged.

The eNB1 discovers that signal quality of the UE2 in a measurement report is high enough after receiving the measurement report of the UE1, a judgment about whether the UE1 meets a condition of switching from the cellular communication mode to the D2D communication mode or not is further triggered according to that mode tendency information, acquired from a core network element, of the UE1 indicates that the D2D communication mode is preferably adopted on a UE level (preferably on the UE level).

The eNB1 judges whether the UE1 meets the condition of switching from the cellular communication mode to the D2D communication mode includes: the eNB1 judges whether the UE1 supports a D2D communication function or not, the eNB1 judges whether the UE1 performs cellular data communication with UE2 or not, the eNB1 judges whether the UE1 is proximal to the UE2 or not and whether there are enough D2D communication air interface resources for D2D communication between the UE1 and the UE2 or not.

The eNB1 determines that the UE1 supports the D2D communication function according to UE D2D attribute information acquired from an MME/ProSe function or an HSS. Or the eNB1 directly requests the MME/ProSe function to judge whether the UE1 supports D2D communication or not.

The Enb1 may determine that the UE1 is being performing cellular data communication with the UE2 according to the indication about cellular communication between the UE1 and the UE2 in the measurement report message.

The eNB1 determines that the UE1 meets a link quality threshold of D2D communication with the UE2 according to the measurement report of the UE1, thereby determining that UE1 is proximal to the UE2.

The eNB1 judges whether there are enough D2D communication resources supporting corresponding D2D communication or not according to the bearer information corresponding to data stream of the cellular communication between the UE1 and the UE2 and the quality of service information corresponding to data stream and/or bearer of the cellular communication between the UE1 and the UE2. When the D2D air interface resources may support all or a part of data stream of the cellular communication between the UE1 and the UE2, the eNB1 determines that there are enough D2D communication air interface resources for D2D communication between the UE1 and the UE2.

Step 2010: a mode switching negotiation request is sent.

The eNB1 determines the serving eNB of the UE2, and an acquisition method for the serving eNB of the UE2 is beyond the scope of protection of the disclosure. In the example, the serving eNB of the UE2 is the eNB1.

Step 2012: the eNB1 continues judging whether the UE2 meets the mode switching condition or not, including: the eNB1 judges whether the UE2 supports the D2D communication function or not. When the UE2 supports the D2D communication function, the eNB1 sends the mode switching negotiation request message to the UE2. The mode switching negotiation request message may contain one of the followings: an identifier of the UE1, the bearer information corresponding to data stream of the cellular communication between the UE1 and the UE2, the quality of service information corresponding to data stream and/or bearer of the cellular communication between the UE1 and the UE2, a D2D communication resource which may be allocated by the eNB1 and capability information of the UE1. In addition, the mode switching negotiation request message may explicitly include the mode switching type indicating switching from the cellular communication to the D2D communication. The UE2 receives the mode switching negotiation request message, and judges whether the mode switching condition is met or not, specifically including whether there are enough D2D communication resources for the D2D communication between the UE1 and the UE2 or not is judged.

Step 2014: when the UE2 determines that there are not enough D2D communication resources for the D2D communication between the UE1 and the UE2, a mode switching negotiation failure message is sent, the mode switching negotiation failure message including a failure reason indication.

Step 2016: the eNB1 determines that the UE1 cannot perform the mode switching after receiving the mode switching negotiation failure message. The eNB1 sends a mode switching refusing message to the UE1 to indicate a mode switching failure reason.

EXAMPLE 5

Figure 21:
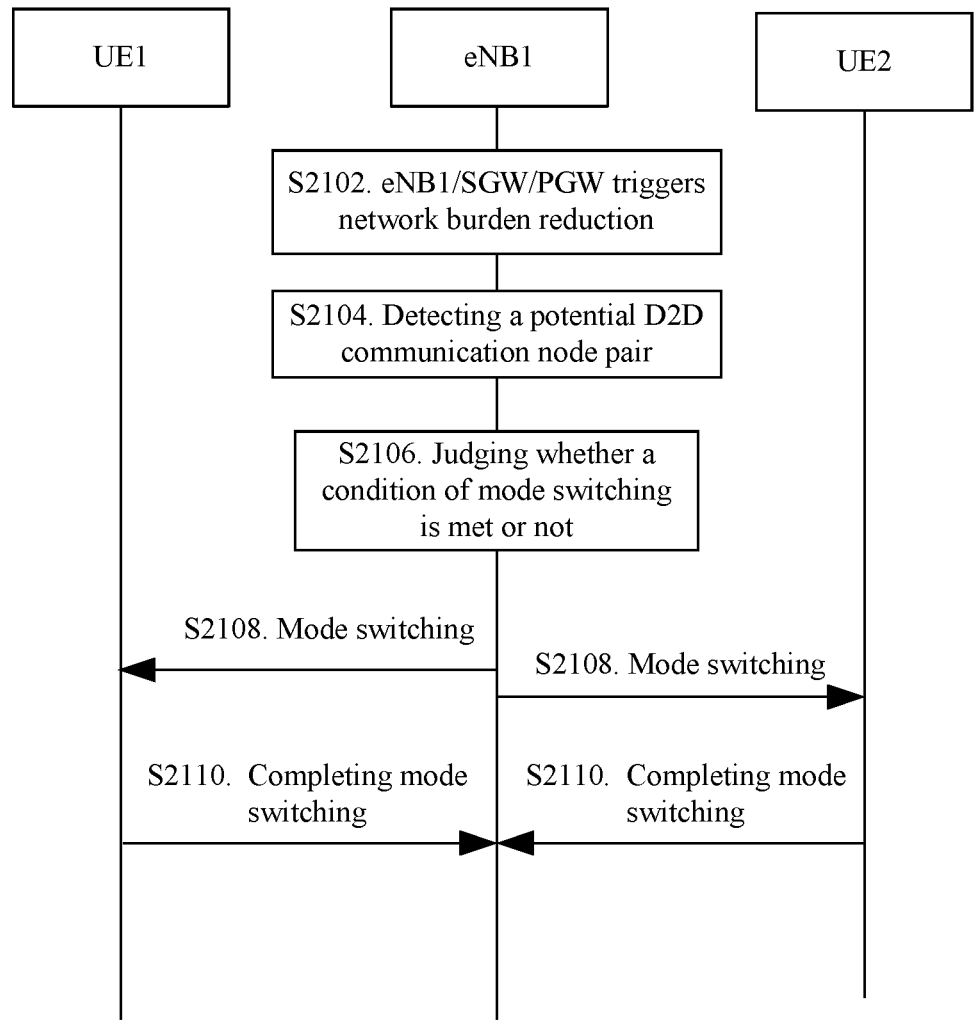
FIG. 21 is a flowchart of mode switching in example 5 according to an embodiment of the disclosure.

In a scenario with a network infrastructure coverage, the eNB1 discovers that there are not enough backbone link resources between the eNB1 and an SGW and network burden reduction is required, so that detection of a potential D2D communication node pair is initiated. FIG. 21 is a flowchart of mode switching in example 5 according to an embodiment of the disclosure, and as shown in FIG. 21, the flow includes the following Step 2102 to Step 2110.

Step 2102: the eNB1/the SGW/the Packet Gateway (PGW) triggers network burden reduction.

Step 2104: a potential D2D communication node pair is detected.

Detection of the potential D2D communication node pair may also be initiated by the SGW or the PGW. Detection of the potential D2D communication node pair refers to discovery of a UE node pair which is served by the same eNB and being performing cellular data communication, and the eNB1/SGW/PGW may perform packet header detection on a communication data packet of served UE, and judges whether the UE1 performs cellular communication with the UE2 served by the same eNB or not according to source and destination addresses. When the eNB1 detects the UE node pair, such as the UE1 and the UE2, meeting the condition, the eNB1 further judges whether a mode switching condition is met or not.

Step 2106: whether the mode switching condition is met or not is judged.

The eNB1 judges whether the UE1 and the UE2 meet a condition of switching from a cellular communication mode to a D2D communication mode or not includes: the eNB1 judges whether the UE1 and the UE2 support a D2D communication function or not, the eNB1 judges whether the UE1 is proximal to the UE2 or not and the eNB1 judges whether there are enough D2D communication air interface resources for the D2D communication between the UE1 and the UE2 or not is judged.

The eNB1 determines that the UE1 and the UE2 support the D2D communication function according to UE D2D attribute information acquired from an MME/ProSe function or an HSS.

The eNB1 requires the UE1 and the UE2 to perform D2D discovery measurement, and determines that the UE1 meets a link quality threshold of the D2D communication with the UE2 according to a measurement report, thereby determining that the UE1 is proximal to the UE2. Or the eNB1 acquires geographical location information or distance information of the UE1 and the UE2 directly from a location server or indirectly from the MME and the ProSe function, and judges whether the UE1 is proximal to the UE2 or not according to the distance information.

The eNB1 judges whether there are enough D2D communication resources supporting corresponding D2D communication or not according to detected bearer information corresponding to data stream of a cellular communication between the UE1 and the UE2 and detected quality of service information corresponding to data stream and/or bearer of the cellular communication between the UE1 and the UE2. When the D2D communication air interface resources may support all or a part of data stream of the cellular communication between the UE1 and the UE2, the eNB1 determines that there are enough D2D communication resources for the D2D communication between the UE1 and the UE2.

The eNB1 determines a serving eNB of the UE2, and an acquisition method for the serving eNB of the UE2 is beyond the scope of protection of the disclosure. In the example, the serving eNB of the UE2 is the eNB1, and the eNB1 continues judging whether the UE2 meets condition of the mode switching or not, specifically including: the eNB1 judges whether the UE2 supports the D2D communication function or not, and the eNB1 may learn about that the UE2 supports the D2D communication function according to the UE D2D attribute information acquired from the MME/ProSe server or the HSS.

Step 2108: the mode switching is performed.

In the case that both the UE1 and the UE2 meet the condition of the mode switching, the eNB1 sends a mode switching message to the UE1 and the UE2. The mode switching message includes the identifiers of the UE required to perform mode switching communication of the eNB1 and switched cellular communication data stream and/or bearer information. In addition, the mode switching message may include resource configuration information for the D2D communication between the UE1 and the UE2 and a scenario where the eNB1 allocates proprietary resources or proprietary resource pools to the UE1 and the UE2 for the D2D communication. When the UE1 and the UE2 have yet not established the D2D communication data bearer or it is discovered that the D2D communication data bearer is required to be modified according to contexts, stored by the eNB1, of the UE1 and the UE2, the mode switching message may further contain D2D communication bearer establishment/modification information, configured to establish the D2D communication bearer between the UE1 and the UE2. In addition, the mode switching message may contain updated TFT information, configured to update and map the original cellular communication data stream between the UE1 and the UE2 from the cellular data bearer to the D2D data bearer. Here, the mode switching message may be born by new designed air interface signalling or RRC reconfiguration signalling and other existing air interface signalling.

The UE1 and the UE2 judge whether to establish the corresponding D2D communication data bearer or not according to the to-be-switched cellular communication data stream and/or bearer information indicated by the mode switching message. When the corresponding bearer has been established and the updated TFT information has been acquired, the UE1 and the UE2 switch the cellular communication data stream indicated by the mode switching message to the corresponding D2D communication data bearer. As to mode switching from cellular communication to D2D communication, the UE1 performs D2D communication with the UE2 by virtue of the D2D communication resource configured in the mode switching message by the eNB1.

Step 2110: mode switching is completed. The UE1 and the UE2 optionally send mode switching completion messages to the eNB1 after completing mode switching. The eNB1 may initiate releasing or modification of the switched cellular communication data bearer after receiving the mode switching completion messages of the UE1 and the UE2. At this point, mode switching of the UE1 and the UE2 from the cellular communication mode to the D2D communication mode is completed.

EXAMPLE 6

In a scenario with a network infrastructure coverage, the eNB1 discovers that there are not enough backbone link resources between the eNB1 and an SGW and network burden reduction is required, so that detection of a potential D2D communication node pair is initiated.

Figure 22:
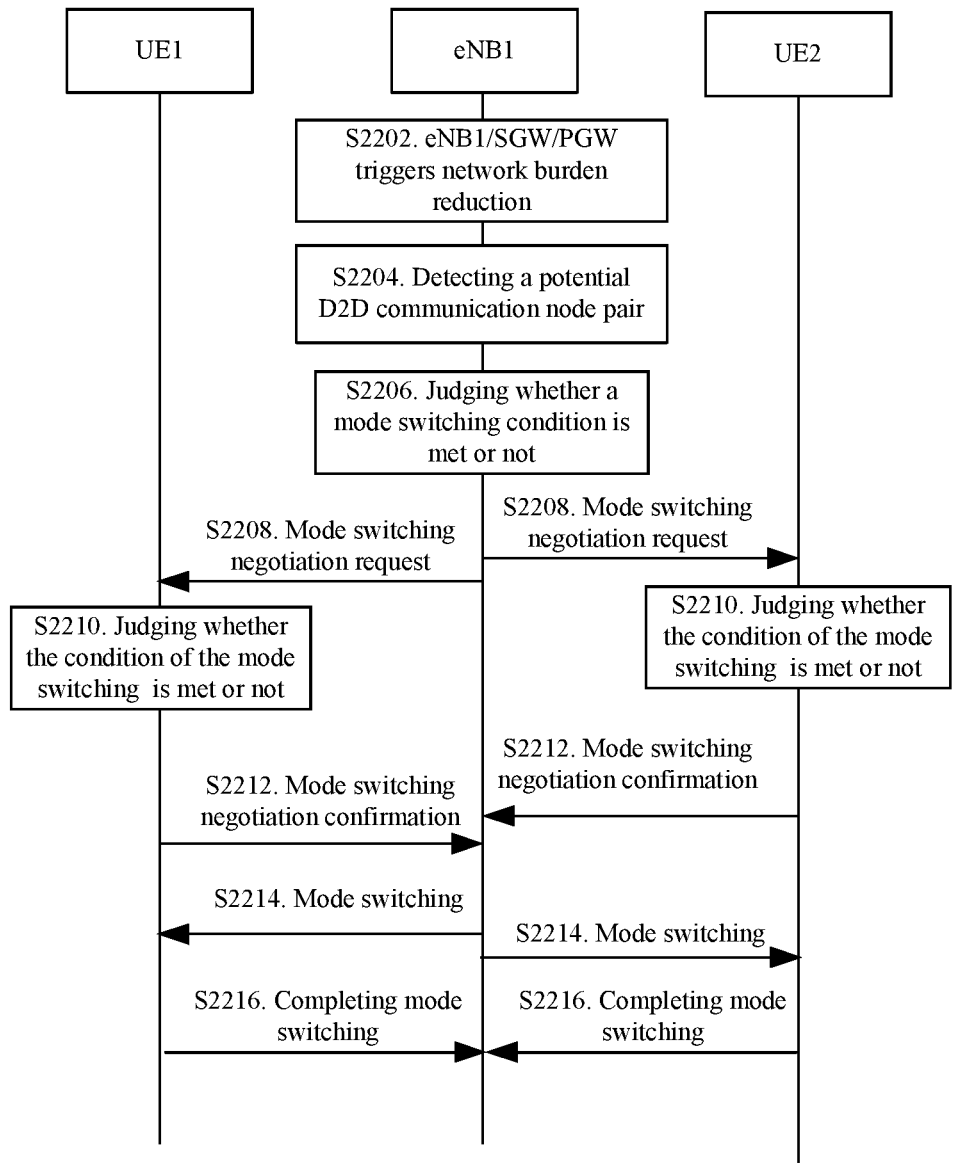
FIG. 22 is a flowchart of mode switching in example 6 according to an embodiment of the disclosure.

FIG. 22 is a flowchart of mode switching in example 6 according to an embodiment of the disclosure, and as shown in FIG. 22, the flow includes the following Step 2202 to Step 2216.

Step 2202: the eNB1 /SGW/PGW triggers network burden reduction.

Step 2204: a potential D2D communication node pair is detected.

Detection of the potential D2D communication node pair may also be initiated by the SGW or the PGW. Detection of the potential D2D communication node pair refers to discovery of a UE node pair which is served by the same eNB and being performing cellular data communication, and the eNB1 /SGW/PGW may perform packet header detection on a communication data packet of served UE, and judges whether the UE1 performs the cellular communication with the UE2 served by the same eNB or not according to source and destination addresses. When the eNB1 detects the UE node pair, such as the UE1 and the UE2, meeting the condition, the eNB1 further judges whether a condition of the mode switching is met or not.

Step 2206: whether the mode switching condition is met or not is judged.

The eNB1 judges whether the UE1 and the UE2 meet a condition of switching from a cellular communication mode to a D2D communication mode or not includes: the eNB1 judges whether the UE1 and the UE2 support a D2D communication function or not, the eNB1 judges whether the UE1 is proximal to the UE2 or not and the eNB1 judges whether there are enough D2D communication air interface resources for D2D communication between the UE1 and the UE2 or not.

The eNB1 determines that the UE1 and the UE2 support the D2D communication function according to UE D2D attribute information acquired from an MME/ProSe function or an HSS.

The eNB1 requires the UE1 and the UE2 to perform D2D discovery measurement, and determines that the UE1 meets a link quality threshold of D2D communication with the UE2 according to a measurement report, thereby determining that the UE1 is proximal to the UE2. Or the eNB1 acquires geographical location information or distance information of the UE1 and the UE2 directly from a location server or indirectly from the MME and the ProSe function, and judges whether the UE1 is proximal to the UE2 or not according to the distance information.

Step 2208: the eNB1 sends a mode switching negotiation request message to the UE1 and the UE2. The mode switching negotiation request message may contain one of the followings: identifiers of the UE1 and the UE2, bearer information corresponding to data stream of a cellular communication between the UE1 and the UE2, quality of service information corresponding to data stream and/or bearer of the cellular communication between the UE1 and the UE2 and capability information of the UE1 and the UE2. In addition, the mode switching negotiation request message may further explicitly include a mode switching type indicating switching from the cellular communication to the D2D communication.

Step 2210: the UE1 and the UE2 receive the mode switching negotiation request message, and judge whether the condition of the mode switching is met or not, specifically including whether there are enough D2D communication resources for the D2D communication between the UE1 and the UE2 or not is judged.

Step 2212: when the UE1 and the UE2 both have enough D2D communication resources for the D2D communication between the UE1 and the UE2, the UE1 and the UE2 send mode switching negotiation confirmation messages to the eNB1.

Step 2214: the mode switching is performed.

After the eNB1 receive the mode switching negotiation confirmation messages from the UE1 and the UE2, the eNB1 sends a mode switching message to the UE1 and the UE2. The mode switching message includes the identifiers of a UE required to perform mode switching communication of the eNB1 and switched cellular communication data stream and/or bearer information. In addition, the mode switching message may include resource configuration information for D2D communication between the UE1 and the UE2 and a scenario where the eNB1 allocates proprietary resources or proprietary resource pools to the UE1 and the UE2 for D2D communication. When the UE1 and the UE2 have yet not established the D2D communication data bearer or it is discovered that the D2D communication data bearer is required to be modified according to contexts, stored by the eNB1 , of the UE1 and the UE2, the mode switching message may further contain D2D communication bearer establishment/modification information, configured to establish the D2D communication bearer between the UE1 and the UE2. In addition, the mode switching message may contain updated TFT information, configured to update and map the original cellular communication data stream between the UE1 and the UE2 from the cellular data bearer to the D2D data bearer. Here, the mode switching message may be born by new designed air interface signalling or RRC reconfiguration signalling and other existing air interface signalling.

The UE1 and the UE2 judge whether to establish the corresponding D2D communication data bearer or not according to the to-be-switched cellular communication data stream and/or bearer information indicated by the mode switching message. When the corresponding bearer has been established and the updated TFT information has been acquired, the UE1 and the UE2 switch the cellular communication data stream indicated by the mode switching message to the corresponding D2D communication data bearer. As to the mode switching from the cellular communication to the D2D communication, the UE1 performs the D2D communication with the UE2 by virtue of the D2D communication resource configured in the mode switching message by the eNB1.

Step 2216: the mode switching is completed. The UE1 and the UE2 optionally send mode switching completion messages to the eNB1 after completing mode switching. The eNB1 may initiate releasing or modification of the switched cellular communication data bearer after receiving the mode switching completion messages of the UE1 and the UE2. At this point, mode switching of the UE1 and the UE2 from the cellular communication mode to the D2D communication mode is completed.

EXAMPLE 7

Figure 23:
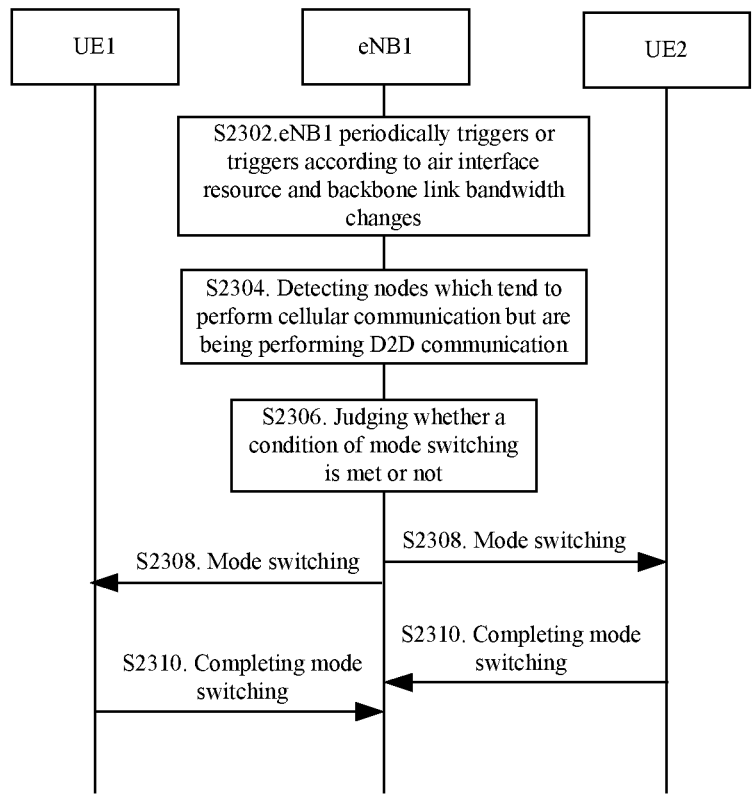
FIG. 23 is a flowchart of mode switching in example 7 according to an embodiment of the disclosure.

In a scenario with a network infrastructure coverage, the eNB1 detects that backbone link resources between the eNB1 and an SGW change and may support more cellular communication. Thus, the eNB1 initiates detection of nodes which tend to perform cellular communication but are being performing the D2D communication. FIG. 23 is a flowchart of mode switching in example 7 according to an embodiment of the disclosure, and as shown in FIG. 23, the flow includes the following Step 2302 to Step 2310.

Step 2302: the eNB1 periodically triggers or triggers according to air interface resource and backbone link bandwidth changes.

Step 2304: nodes which tend to perform the cellular communication but are being performing the D2D communication are detected.

Step 2306: whether a condition of the mode switching is met or not is judged.

When the eNB1 detects a UE node pair, such as the UE1 and the UE2, meeting the conditions, the eNB1 further judges whether the condition of the mode switching is met or not.

The eNB1 judges whether the UE1 and the UE2 meet a condition of switching from a cellular communication mode to a D2D communication mode or not includes: the eNB1 judges whether there are enough D2D communication air interface resources for the cellular communication between the UE1 and the UE2 or not is judged. When the eNB1 determines that the condition is met, the eNB1 sends a mode switching message to the UE1 and the UE2. The mode switching message includes identifiers of a UE required to perform mode switching communication of the eNB1 and switched D2D communication data stream and/or bearer information. When the UE1 and the UE2 have yet not established the cellular communication data bearer or it is discovered that the cellular communication data bearer is required to be modified according to contexts, stored by the eNB1, of the UE1 and the UE2, the mode switching message may further contain cellular communication bearer establishment/modification information, which is used for establishing the cellular communication bearer between the UE1 and the UE2. In addition, the mode switching message may contain updated TFT information, configured to update and map the original cellular communication data stream between the UE1 and the UE2 from the D2D data bearer to the cellular data bearer. Here, the mode switching message may be born by new designed air interface signalling or RRC reconfiguration signalling and other existing air interface signalling.

Step 2308: the mode switching is performed.

The UE1 and the UE2 judge whether to establish the corresponding cellular communication data bearer or not according to the to-be-switched D2D communication data stream and/or bearer information indicated by the mode switching message. When the corresponding bearer has been established and the updated TFT information has been acquired, the UE1 and the UE2 switch the D2D communication data stream indicated by the mode switching message to the corresponding cellular communication data bearer.

Step 2310: the mode switching is completed.

The UE1 and the UE2 optionally send mode switching completion messages to the eNB1 after completing mode switching. The eNB1 may initiate releasing or modification of the switched D2D communication data bearer after receiving the mode switching completion messages of the UE1 and the UE2. At this point, mode switching of the UE1 and the UE2 from the D2D communication mode to the cellular communication mode is completed.

Embodiment 2

The embodiment provides a method for mode switching of a UE in a scenario with a network coverage. A characteristic of the embodiment is that the UE which performs mode switching is covered by different eNBs. In order to implement mode switching, signalling interaction between the eNBs and between the eNBs and a core network element includes the following basic flow.

Figure 24:
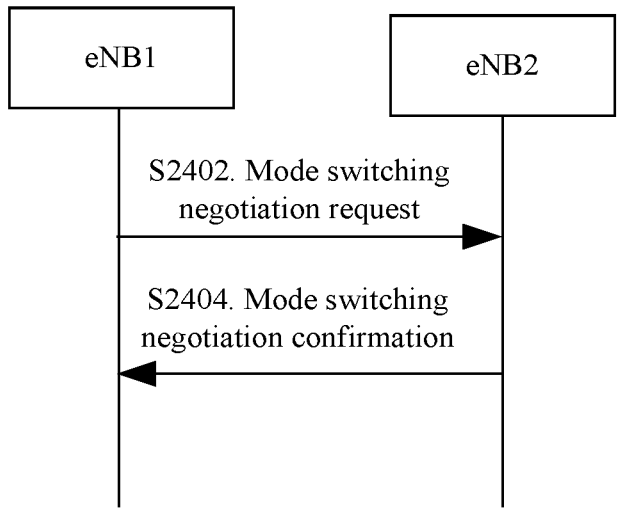
FIG. 24 is a flowchart of mode switching negotiation between adjacent eNBs according to an embodiment of the disclosure.

The embodiment provides a flow of mode switching negotiation between adjacent eNBs, FIG. 24 is a flowchart of mode switching negotiation between adjacent eNBs according to an embodiment of the disclosure, and as shown in FIG. 24, the flow includes the following Step 2402 to Step 2404.

Step 2402: an eNB1 sends a mode switching negotiation request message to an eNB2.

Step 2404: an eNB2 judges whether a condition of the mode switching is met or not after receiving the message, and when the condition of the mode switching is met, sends a mode switching negotiation confirmation message to the eNB1. The eNB1 determines that mode switching negotiation succeeds after receiving the mode switching negotiation confirmation message.

Figure 25:
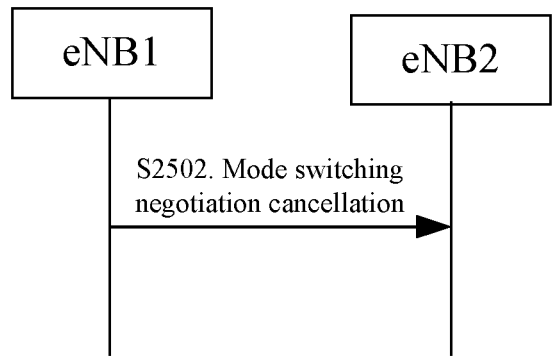
FIG. 25 is a flowchart of cancellation of mode switching negotiation between adjacent eNBs according to an embodiment of the disclosure.

In the embodiment, a flow of cancelling mode switching negotiation by the eNB, as shown in FIG. 25, includes the following Step 2502.

Step 2502: when the eNB1 initiates mode switching negotiation, and discovers that the related UE does not meet the mode switching condition before receiving the mode switching negotiation confirmation message, the eNB1 sends a mode switching negotiation cancellation message to the eNB2.

Figure 26:
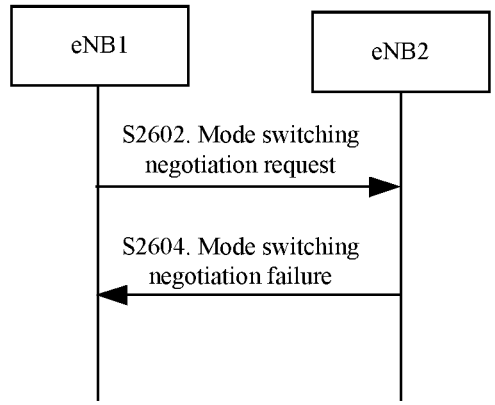
FIG. 26 is a flowchart of failing of mode switching negotiation between adjacent eNBs according to an embodiment of the disclosure.

A flow of failing of mode switching negotiation between the adjacent eNBs, as shown in FIG. 26, includes the following Step 2602 to Step 2604.

Step 2602: the eNB1 sends the mode switching negotiation request message to the eNB2.

Step 2604: the eNB2 judges whether the condition of the mode switching is met or not after receiving the message, and when the condition of the mode switching is not met, sends a mode switching negotiation failure message to the eNB1. The eNB1 determines that mode switching negotiation fails after receiving the mode switching negotiation failure message.

Figure 27:
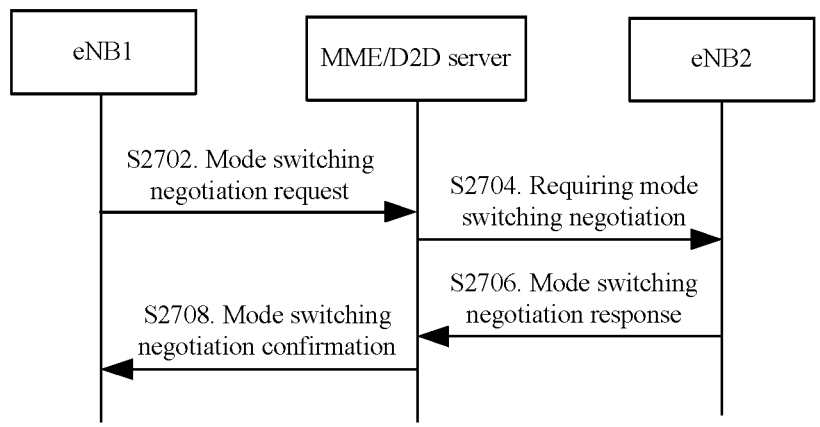
FIG. 27 is a flowchart of mode switching negotiation between adjacent eNBs through an MME according to an embodiment of the disclosure.

A flow of mode switching negotiation between the adjacent eNBs through an MME, as shown in FIG. 27, includes the following Step 2702 to Step 2708.

Step 2702: the eNB1 sends the mode switching negotiation request message to the MME.

Step 2704: the MME judges whether the condition of the mode switching is met or not after receiving the message, and forwards a mode switching negotiation message to the eNB2.

Step 2706: the eNB2 judges whether the condition of mode switching is met or not after receiving the message, and when the condition of the mode switching is met, sends a mode switching negotiation response message to the MME.

Step 2708: the MME forwards the mode switching negotiation confirmation message to the eNB1 after receiving the message. The eNB1 determines that mode switching negotiation succeeds after receiving the mode switching negotiation confirmation message.

The mode switching method for the D2D system is described below with example 8 to example 10 in detail.

EXAMPLE 8

Figure 28:
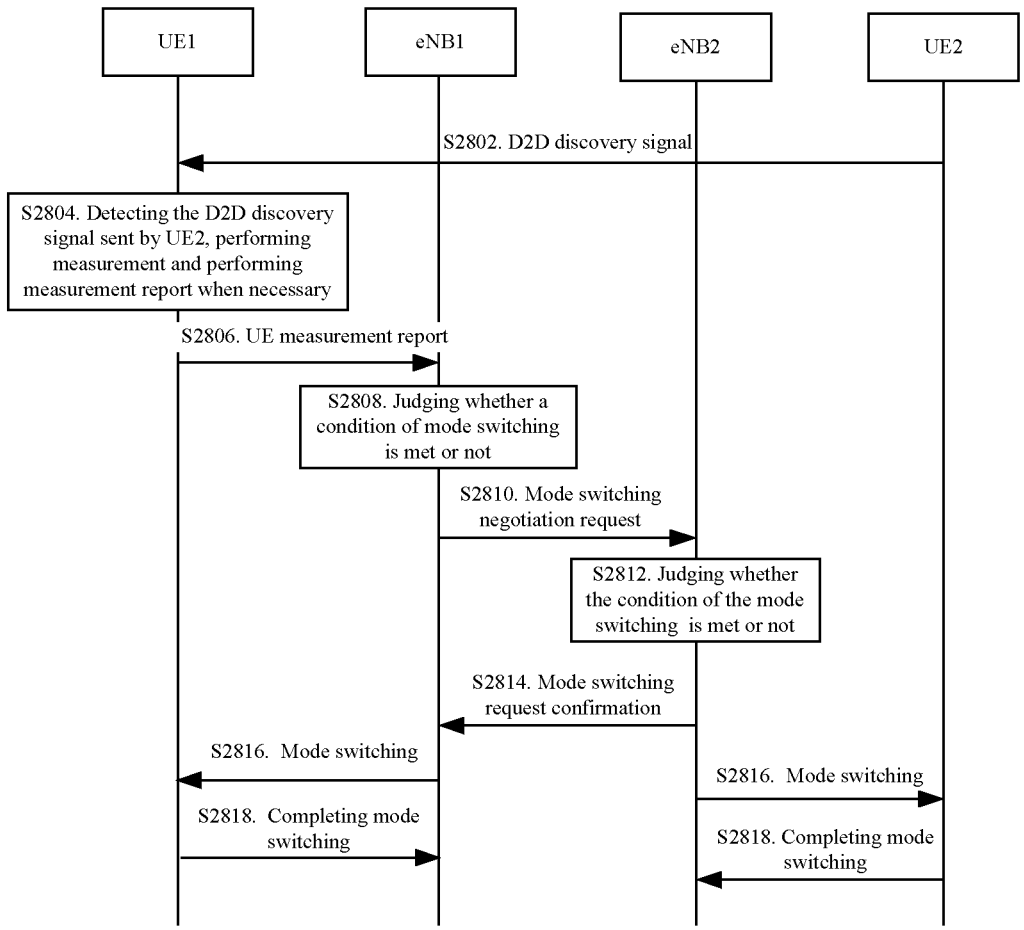
FIG. 28 is a flowchart of mode switching in example 8 according to an embodiment of the disclosure.

In a scenario with a network infrastructure coverage, the UE1 and the UE2 have D2D discovery and D2D communication capabilities and enable a D2D function. Data session communication is established between the UE1 and the UE2, and a data stream may be forwarded through an infrastructure of a cellular network. Along with gradual movement of UE1 to a surrounding area of the UE2, the UE1 may detect a discovery signal sent by the UE2. Along with gradual reduction of a distance between the UE1 and the UE2, the discovery signal detected by the UE1 and sent by the UE2 gets stronger and stronger, and exceeds a set measurement report threshold, and then the UE1 sends a measurement report message to a serving eNB eNB1. FIG. 28 is a flowchart of mode switching in example 8 according to an embodiment of the disclosure, and as shown in FIG. 28, the flow includes the following Step 2802 to Step 2818.

Step 2802: the UE2 sends a D2D discovery signal to the UE1.

Step 2804: the UE1 detects the D2D discovery signal sent by the UE2, performs measurement, and performs measurement report when necessary.

Step 2806: the UE1 performs measurement report.

A measurement report message may include an identifier of the UE2, a signal measurement result, obtained by the UE1, of the UE2, a signal measurement result, obtained by the UE1, of a serving eNB, an indication about the cellular communication between the UE1 and the UE2, bearer information corresponding to data stream of the cellular communication between the UE1 and the UE2, quality of service information corresponding to data stream and/or bearer of the cellular communication between the UE1 and the UE2 and an indication about whether a corresponding D2D communication data bearer is established between the UE1 and the UE2 or not and/or the D2D communication data bearer is required to be established between the UE1 and the UE2. In addition, the measurement report message may further include a mode switching type and information of a serving eNB of the UE2, wherein the mode switching type indicates switching from a cellular communication mode to a D2D communication mode.

Step 2808: the eNB1 judges whether a condition of the mode switching is met or not.

The eNB1 discovers that signal quality of the UE2 in the measurement report is high enough after receiving the measurement port of the UE1, a judgment about whether the UE1 meets a condition of switching from the cellular communication mode to the D2D communication mode or not is further triggered according to that mode tendency information, acquired from a core network element, of the UE1 indicates that the D2D communication mode is preferably adopted on a UE level (preferably on the UE level).

The eNB1 judges whether the UE1 meets the condition of switching from the cellular communication mode to the D2D communication mode or not includes: the eNB1 judges whether the UE1 supports a D2D communication function or not, the eNB1 judges whether the UE1 performs cellular data communication with the UE2 or not, the eNB1 judges whether the UE1 is proximal to the UE2 or not and the eNB1 judges whether there are enough D2D communication air interface resources for the D2D communication between the UE1 and the UE2 or not.

The eNB1 determines that the UE1 supports the D2D communication function according to UE D2D attribute information acquired from an MME/ProSe function or an HSS.

The eNB1 may determine that the UE1 is being performing cellular data communication with the UE2 according to the indication about cellular communication between the UE1 and the UE2 in the measurement report message.

The eNB1 determines that the UE1 meets a link quality threshold of the D2D communication with the UE2 according to the measurement report of the UE1, thereby determining that the UE1 is proximal to the UE2.

The eNB1 judges whether there are enough D2D communication resources supporting corresponding D2D communication or not according to the bearer information corresponding to data stream of the cellular communication between the UE1 and the UE2 and the quality of service information corresponding to data stream and/or bearer of the cellular communication between the UE1 and the UE2. When the D2D air interface resources may support all or a part of data stream of the cellular communication between the UE1 and the UE2, the eNB1 determines that there are enough D2D communication air interface resources for the D2D communication between the UE1 and the UE2.

Step 2810: the eNB1 sends a mode switching negotiation request message to the eNB2.

The eNB1 determines the serving eNB of the UE2, and an acquisition method for the serving eNB of the UE2 is beyond the scope of protection of the disclosure. In the example, the serving eNB of the UE2 is the eNB2, and the eNB1 is required to negotiate with the eNB2. The eNB1 sends the mode switching negotiation request message to the eNB2 . The mode switching negotiation request message may contain one of the followings: an identifier of the UE1, the identifier of the UE2, bearer information corresponding to a cellular communication data stream supported by the eNB2 between the UE1 and the UE2, quality of service information corresponding to a cellular communication data stream and/or bearer supported by the eNB1 between the UE1 and the UE2, the indication about whether the corresponding D2D communication bearer is established between the UE1 and the UE2 or not and/or the D2D communication bearer is required to be established between the UE1 and the UE2, a D2D communication resource which may be allocated to the UE1 by the eNB1 and capability information of the UE1.

Step 2812: the eNB2 judges whether the condition of the mode switching is met or not.

The eNB2 receives the mode switching negotiation request message, and judges whether the UE2 meets the condition of the mode switching or not, specifically including the eNB2 judges whether the UE2 supports the D2D communication function or not and the eNB2 judges whether there are enough D2D communication resources for the D2D communication between the UE1 and the UE2 or not.

The eNB2 may determine that the UE2 supports the D2D communication function according to UE D2D attribute information acquired from the MME/ProSe server or the HSS.

The eNB2 judges whether there are corresponding resources allocated to the UE2 for the D2D communication or not according to the received bearer information corresponding to the D2D communication data stream supported by the eNB1 between the UE1 and the UE2, the quality of service information corresponding to data stream and/or bearer of the cellular communication between the UE1 and the UE2 and/or D2D communication air interface resource information which may be allocated to the UE1 by the serving eNB of the UE1. When the D2D communication air interface resources may support all or a part of cellular communication data streams supported by the eNB1 between the UE1 and the UE2, the eNB2 determines that a condition that there are enough D2D communication air interface resources for the D2D communication between the UE1 and the UE2 is met.

Step 2814: when UE2 meets the condition of the mode switching, the eNB2 sends a mode switching negotiation request confirmation message to the eNB1. The mode switching negotiation request confirmation message may include at least one of the followings: bearer information corresponding to a D2D communication data stream supported by the eNB2 between the UE1 and the UE2, quality of service information corresponding to the D2D communication data stream and/or bearer supported by the eNB2 between the UE1 and the UE2, the resource information which may be allocated to the UE1 and the UE2 for the D2D communication and the capability information supported by both the UE1 and the UE2. In addition, the mode switching negotiation request confirmation message may further include the following information: bearer information corresponding to a D2D communication data stream which is not supported by the eNB2 between the UE1 and the UE2 and quality of service information corresponding to the D2D communication data stream and/or bearer which is not supported by the eNB2 between the UE1 and the UE2.

Step 2816: the mode switching is performed.

After the eNB1 receives the mode switching negotiation request confirmation message, mode switching negotiation succeeds, and the eNB1 sends a mode switching message to the UE1 and the UE2. The mode switching message includes the identifiers of a UE required to perform mode switching communication of the eNB1 and switched cellular communication data stream and/or bearer information. In addition, the mode switching message may include resource configuration information for the D2D communication between the UE1 and the UE2 and a scenario where the eNB1 allocates proprietary resources or proprietary resource pools to the UE1 and the UE2 for D2D communication. When the UE1 and the UE2 have yet not established the D2D communication data bearer or the measurement report message includes the indication about that the D2D communication data bearer is required to be established, the mode switching message may further contain D2D communication bearer establishment information, which is used for establishing the D2D communication bearer between the UE1 and the UE2. In addition, the mode switching message may contain updated TFT information, configured to update and map the original cellular communication data stream between the UE1 and the UE2 from the cellular data bearer to the D2D data bearer. Here, the mode switching message may be born by new designed air interface signalling or RRC reconfiguration signalling and other existing air interface signalling.

The UE1 and the UE2 judge whether to establish the corresponding D2D communication data bearer or not according to the to-be-switched cellular communication data stream and/or bearer information indicated by the mode switching message. When the corresponding bearer has been established and the updated TFT information has been acquired, the UE1 and the UE2 switch the cellular communication data stream indicated by the mode switching message to the corresponding D2D communication data bearer. As to the mode switching from the cellular communication to the D2D communication, the UE1 performs D2D communication with the UE2 by virtue of the D2D communication resource configured in the mode switching message by the eNB1.

Step 2818: the mode switching is completed.

The UE1 and the UE2 optionally send mode switching completion messages to the eNB1 after completing mode switching. The eNB1 may initiate releasing or modification of the switched cellular communication data bearer after receiving the mode switching completion messages of the UE1 and the UE2. At this point, mode switching of the UE1 and the UE2 from the cellular communication mode to the D2D communication mode is completed.

EXAMPLE 9

Figure 29:
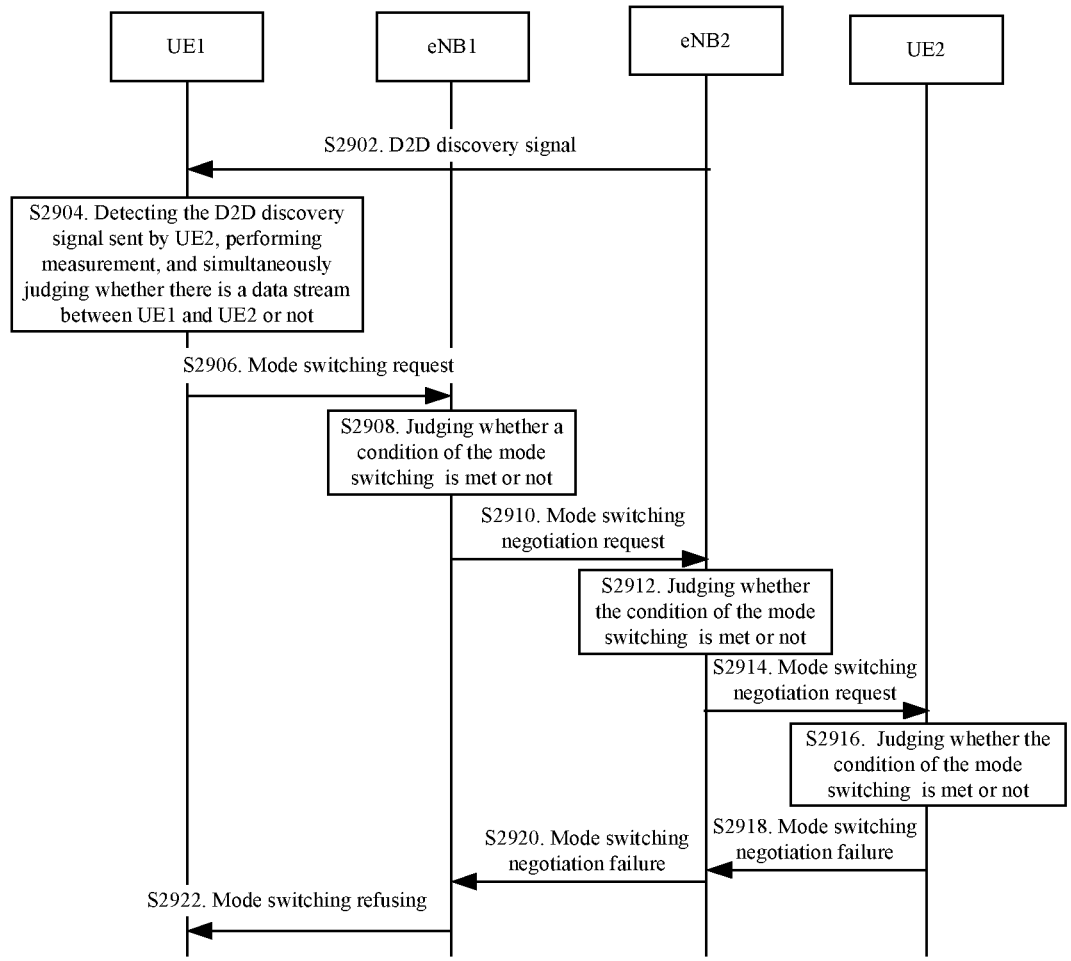
FIG. 29 is a flowchart of mode switching in example 9 according to an embodiment of the disclosure.

In a scenario with a network infrastructure coverage, the UE1 and the UE2 have D2D discovery and D2D communication capabilities and enable a D2D function. Data session communication is established between the UE1 and the UE2, and a data stream may be forwarded through an infrastructure of a cellular network. Along with gradual movement of the UE1 to a surrounding area of the UE2, the UE1 may detect a discovery signal sent by the UE2. Along with gradual reduction of a distance between the UE1 and the UE2, the discovery signal detected by the UE1 and sent by the UE2 gets stronger and stronger. At the same time, the UE1 determines existence of a cellular communication data stream between the UE1 and the UE2. The UE1 sends a mode switching request message to a serving eNB eNB1. As shown in FIG. 29, the flow includes Step 2902 to Step 2922.

Step 2902: the UE2 sends a D2D discovery signal to UE1.

Step 2904: the UE1 detects the D2D discovery signal sent by the UE2, performs measurement, and simultaneously judges whether there is a data stream between the UE1 and the UE2.

Step 2906: the UE1 sends a mode switching request message to the eNB1.

The mode switching request message may include an identifier of the UE2, a signal measurement result, obtained by the UE1, of the UE2, an indication about cellular communication between the UE1 and the UE2, bearer information corresponding to data stream of the cellular communication between the UE1 and the UE2, quality of service information corresponding to data stream and/or bearer of the cellular communication between the UE1 and the UE2 and an indication about whether a corresponding D2D communication data bearer is established between the UE1 and the UE2 or not and/or the D2D communication data bearer is required to be established between the UE1 and the UE2. In addition, the mode switching request message may further include a mode switching type and information of a serving eNB of the UE2, wherein the mode switching type indicates switching from a cellular communication mode to a D2D communication mode.

Step 2908: the eNB1 judges whether a condition of the mode switching is met or not.

The eNB1 triggers a judgment about whether the UE1 meets a condition of switching from the cellular communication mode to the D2D communication mode or not after receiving the mode switching request message of the UE1. The eNB1 judges whether the UE1 meets the condition of switching from the cellular communication mode to the D2D communication mode includes: the eNB1 judges whether the UE1 supports a D2D communication function, the eNB1 judges whether UE1 performs cellular data communication with UE2 or not, the eNB1 judges whether UE1 is proximal to UE2 or not and the eNB1 judges whether there are enough D2D communication air interface resources for D2D communication between the UE1 and the UE2 or not.

The eNB1 determines that the UE1 supports the D2D communication function according to UE D2D attribute information acquired from an MME/ProSe function or an HSS.

The eNB1 may determine that the UE1 is being performing cellular data communication with the UE2 according to the indication about cellular communication between the UE1 and the UE2 in the measurement report message.

The eNB1 determines that the UE1 meets a link quality threshold of the D2D communication with the UE2 according to the measurement report of the UE1, thereby determining that the UE1 is proximal to the UE2.

The eNB1 judges whether there are enough D2D communication resources supporting corresponding D2D communication or not according to the bearer information corresponding to data stream of the cellular communication between the UE1 and the UE2 and the quality of service information corresponding to data stream and/or bearer of the cellular communication between the UE1 and the UE2. When the D2D air interface resources may support all or a part of data stream of the cellular communication between the UE1 and the UE2, the eNB1 determines that there are enough D2D communication air interface resources for the D2D communication between the UE1 and the UE2.

Step 2910: the eNB1 sends a mode switching negotiation request message to the eNB2.

The eNB1 determines the serving eNB of the UE2, and an acquisition method for the serving eNB of the UE2 is beyond the scope of protection of the disclosure. In the example, the serving eNB of the UE2 is the eNB1, and the eNB1 is required to negotiate with the eNB2. The eNB1 sends the mode switching negotiation request message to the eNB2. The mode switching negotiation request message may contain at least one of the followings: an identifier of the UE1, the identifier of the UE2, bearer information corresponding to a cellular communication data stream supported by the eNB1 between the UE1 and the UE2, quality of service information corresponding to a cellular communication data stream and/or bearer supported by eNB1 between the UE1 and the UE2, the indication about whether the corresponding D2D communication bearer is established between the UE1 and the UE2 or not and/or the D2D communication bearer is required to be established between the UE1 and the UE2, a D2D communication resource which may be allocated to the UE1 by the eNB1 and capability information of the UE1.

Step 2912: the eNB2 judges whether the condition of the mode switching is met or not.

The eNB2 receives the mode switching negotiation request message, and judges whether the UE2 meets the condition of the mode switching or not, specifically including the eNB2 judges whether the UE2 supports the D2D communication function or not and the eNB2 judges whether there are enough D2D communication resources for the D2D communication between the UE1 and the UE2 or not.

Step 2914: the eNB2 sends a mode switching negotiation request message to the UE2.

The eNB2 judges whether the UE2 supports the D2D communication function or not at first. When the UE2 supports the D2D communication function, the eNB2 sends the mode switching negotiation request message to the UE2. The mode switching negotiation request message may contain at least one of the followings: the identifier of the UE1, the bearer information corresponding to data stream of the cellular communication between the UE1 and the UE2, the quality of service information corresponding to data stream and/or bearer of the cellular communication between the UE1 and the UE2, the D2D communication resource which may be allocated by the eNB1 and the capability information of the UE1. In addition, the mode switching negotiation request message may further explicitly include a mode switching type indicating switching from the cellular communication to the D2D communication.

Step 2916: the UE2 receives the mode switching negotiation request message, and judges whether the condition of the mode switching is met or not, specifically including the UE2 judges whether there are enough D2D communication resources for the D2D communication between the UE1 and the UE2 or not.

Step 2918: when the UE2 determines that there are not enough D2D communication resources for the D2D communication between the UE1 and the UE2, a mode switching negotiation failure message is sent, the mode switching negotiation failure message including a failure reason indication.

Step 2920: the eNB2 determines that the UE1 cannot perform the mode switching after receiving the mode switching negotiation failure message, and sends the mode switching negotiation failure message to the eNB1, the message including the failure reason indication.

Step 2922: the eNB1 sends a mode switching refusing message to the UE1 to indicate a mode switching failure reason after receiving the message.

EXAMPLE 10

Figure 30:
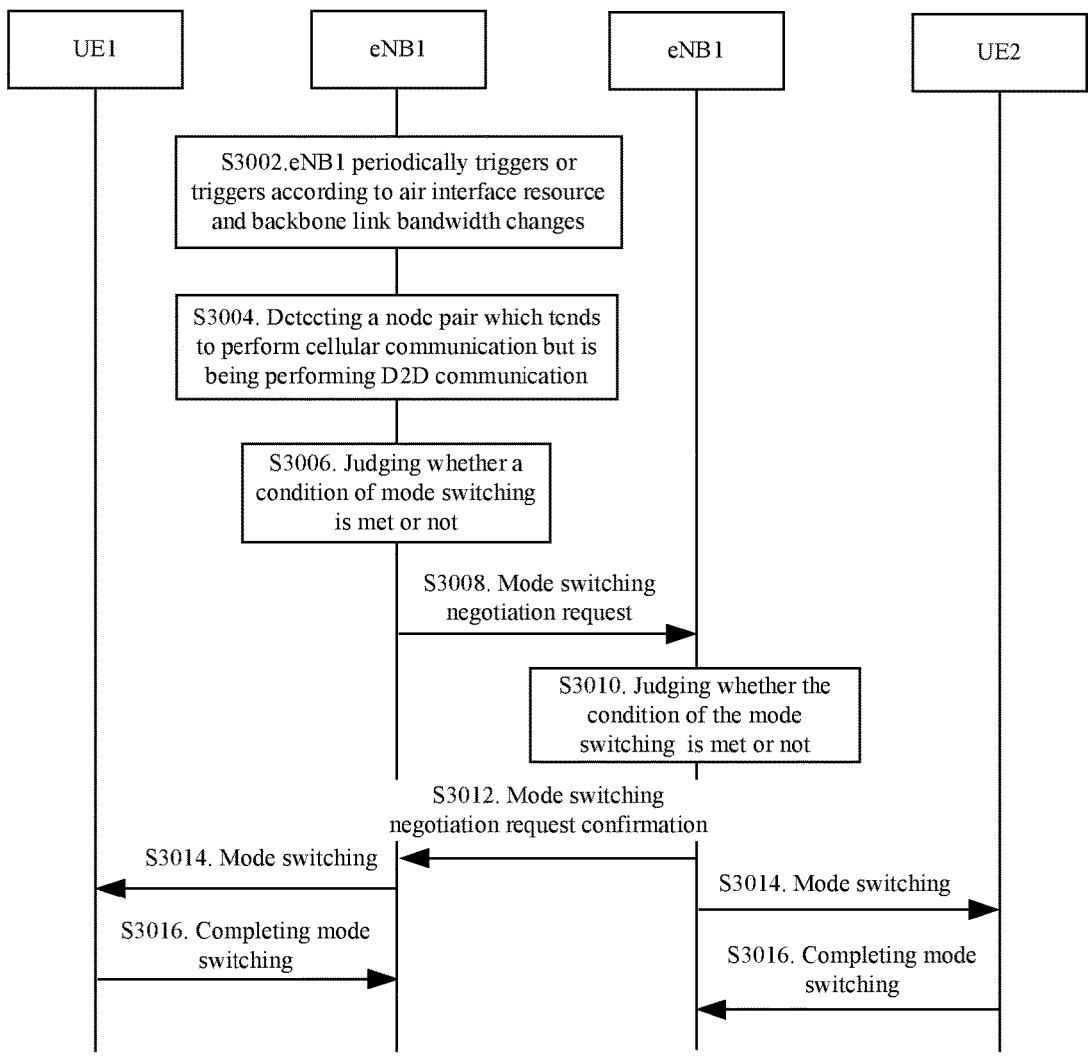
FIG. 30 is a flowchart of mode switching in example 10 according to an embodiment of the disclosure.

In a scenario with a network infrastructure coverage, the eNB1 detects that backbone link resources between the eNB1 and an SGW change and may support more cellular communication. Thus, the eNB1 initiates detection of nodes which tend to perform the cellular communication but are being performing the D2D communication. As shown in FIG. 30, the flow includes the following Step 3002 to Step 3016.

Step 3002: the eNB1 periodically triggers or triggers according to air interface resource and backbone link bandwidth changes.

Step 3004: a node pair which tends to perform the cellular communication but is being performing the D2D communication is detected.

Step 3006: whether a condition of the mode switching is met or not is judged.

When the eNB1 detects the UE node pair, such as the UE1 and the UE2, meeting the conditions, the eNB1 further judges whether the condition of the mode switching is met or not.

The eNB1 judges whether the UE1 and the UE2 meet a condition of switching from a cellular communication mode to a D2D communication mode or not includes: the eNB1 judges whether there are enough air interface resources for cellular communication between the UE1 and the UE2 or not. When the eNB1 determines that the UE1 meets the condition, the eNB1 determines a serving eNB of the UE2.

Step 3008: a mode switching negotiation request message is sent.

In the example, the serving eNB of the UE2 is the eNB2, and the eNB1 is required to negotiate with the eNB2. The eNB1 sends the mode switching negotiation request message to the eNB2. The mode switching negotiation request message may contain at least one of the followings: an identifier of the UE1, an identifier of the UE2, bearer information corresponding to a D2D communication data stream supported by the eNB1 between the UE1 and the UE2, quality of service information corresponding to a D2D communication data stream and/or bearer supported by the eNB1 between the UE1 and the UE2 and an indication about whether a corresponding cellular communication bearer is established between the UE1 and the UE2 or not and/or the cellular communication bearer is required to be established between the UE1 and the UE2.

Step 3010: whether the condition of the mode switching is met or not is judged.

The eNB2 receives the mode switching negotiation request message, and judges whether UE2 meets the condition of the mode switching or not, specifically including the eNB2 judges whether the UE2 supports the D2D communication function or not and the eNB2 judges whether there are enough cellular communication air interface resources for the cellular communication between the UE1 and the UE2 or not.

The eNB2 may determine that the UE2 supports the D2D communication function according to UE D2D attribute information acquired from an MME/ProSe server or an HSS.

The eNB2 judges whether there are corresponding resources allocated to the UE2 for the cellular communication or not according to the received bearer information corresponding to the cellular communication data stream supported by the eNB1 between the UE1 and the UE2 and the quality of service information corresponding to the D2D communication data stream and/or bearer between the UE1 and the UE2. When the cellular air interface resources and/or backbone link resources may support all or a part of cellular communication data stream supported by the eNB1 between the UE1 and the UE2, the eNB2 determines that a condition that there are enough D2D communication air interface resources for cellular communication between the UE1 and the UE2 is met.

Step 3012: a mode switching negotiation request confirmation message is sent.

When the UE2 meets the condition of the mode switching, the eNB2 sends the mode switching negotiation request confirmation message to the eNB1. The mode switching negotiation request confirmation message may include at least one of the followings: bearer information corresponding to a cellular communication data stream supported by the eNB2 between the UE1 and the UE2 and quality of service information corresponding to the cellular communication data stream and/or bearer supported by the eNB2 between the UE1 and the UE2. In addition, the mode switching negotiation request confirmation message may further include the following information: bearer information corresponding to a cellular communication data stream which is not supported by the eNB2 between the UE1 and the UE2 and quality of service information corresponding to the cellular communication data stream and/or bearer which is not supported by the eNB2 between the UE1 and the UE2.

Step 3014: the mode switching is performed.

After the eNB1 receives the mode switching negotiation request confirmation message, mode switching negotiation succeeds. The eNB1 and the eNB2 send mode switching messages to the UE1 and the UE2 respectively. The mode switching messages include the identifiers of a UE required to perform mode switching communication of the eNB1 and the eNB2 and switched cellular communication data stream and/or bearer information. When the UE1 and the UE2 have yet not established the cellular communication data bearer or it is discovered that the cellular communication data bearer is required to be modified according to contexts, stored by the eNB1, of the UE1 and the UE2, the mode switching message may further contain cellular communication bearer establishment/modification information, configured to establish the cellular communication bearer between the UE1 and the UE2. In addition, the mode switching message may contain updated TFT information, configured to update and map the original cellular communication data stream between the UE1 and the UE2 from the D2D data bearer to the cellular data bearer. Here, the mode switching message may be born by new designed air interface signalling or RRC reconfiguration signalling and other existing air interface signalling.

The UE1 and the UE2 judge whether to establish the corresponding cellular communication data bearer or not according to the to-be-switched D2D communication data stream and/or bearer information indicated by the mode switching message. When the corresponding bearer has been established and the updated TFT information has been acquired, the UE1 and the UE2 switch the D2D communication data stream indicated by the mode switching message to the corresponding cellular communication data bearer.

Step 3016: the mode switching is completed.

The UE1 and the UE2 optionally send mode switching completion messages to the eNB1 after completing mode switching. The eNB1 may initiate releasing or modification of the switched D2D communication data bearer after receiving the mode switching completion messages of the UE1 and the UE2. At this point, mode switching of the UE1 and the UE2 from the cellular communication mode to the D2D communication mode is completed.

A systematic and perfect solution to the mode switching is not given in the related art. By the method provided by the disclosure, the network infrastructure may require a UE to be flexibly switched between the cellular communication mode and the D2D communication mode according to a load condition of the UE and ensure the service continuity to implement an improvement in overall throughput of the system.

Obviously, those skilled in the art should know that each of the mentioned components or steps of the disclosure may be realized by universal computing devices; the modules or steps may be focused on single computing device, or distributed on the network formed by multiple computing devices; selectively, they may be realized by the program codes which may be executed by the computing device; thereby, the modules or steps may be stored in the storage device and executed by the computing device; and under some circumstances, the shown or described steps may be executed in different orders, or may be independently manufactured as each integrated circuit module, or multiple modules or steps thereof may be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for mode switching, comprising:
    sending, by a first base station, a message comprising mode switching information to a first User Equipment, UE, to trigger the first UE to perform mode switching according to indication information of a mode carried in the mode switching information;
    wherein determining, by the first base station, the MME or the ProSe function, that the first UE meets the condition of the mode switching comprises:
    when the following conditions are met, determining that the first UE meets a condition of switching from a cellular communication mode to a D2D communication mode: the first UE supports a D2D communication function or passes D2D communication authorization and authentication, cellular communication is performed between the first UE and the second UE, the first UE is in a proximity with the second UE, and there are enough D2D communication air interface resources for D2D communication between the first UE and the second UE;
    when one of the following conditions is met, determining that the first UE meets a condition of switching from the D2D communication mode to the cellular communication mode: D2D communication is performed between the first UE and the second UE, and there are enough cellular communication air interface and backbone link resources;
    D2D communication is performed between the first UE and the second UE, the first UE is not in the proximity with the second UE, and there are enough cellular communication air interface and backbone link resources;
    wherein, the second UE refers to one of the followings: a UE which has established cellular communication with the first UE, a UE which has established D2D communication with the first UE.

2. The method as claimed in claim 1, wherein before sending, by the first base station, the message comprising the mode switching information to the first UE, the method further comprises:
    determining, by the first base station, that the first UE meets a condition of the mode switching, wherein the first base station is a serving base station of the first UE.

3. The method as claimed in claim 2, wherein determining, by the first base station, that the first UE meets the condition of the mode switching comprises:
    sending, by the first base station, a first mode switching request to a Mobility Management Entity, MME, or a Device-to-Device, D2D, server; and receiving, by the first base station, a first mode switching response message sent by the MME or the ProSe function, wherein the first mode switching response message is used for indicating that the first UE meets the condition of the mode switching; or
    receiving, by the first base station, a message which is sent, by the MME or the ProSe function, to the first base station and used for indicating the first UE to perform the mode switching.

4. The method as claimed in claim 3, wherein the first mode switching request information and the second mode switching request information comprise at least one of the followings: an identifier of a second UE, a signal measurement result, obtained by the first UE, of a second UE, a signal measurement result, obtained by the first UE, of the first base station, an indication indicating which one of cellular communication and D2D communication is performed between the first UE and a second UE, bearer information corresponding to a data stream of cellular communication or D2D communication between the first UE and a second UE, quality of service information corresponding to data stream and/or bearer of cellular communication or D2D communication between the first UE and a second UE, an indication about whether D2D communication data bearer has been established between the first UE and a second UE or not and/or D2D communication data bearer is required to be established between the first UE and a second UE;
    or the first mode switching request information and the second mode switching request information comprise information of a second base station, wherein the second base station is a serving base station of a second UE.

5. The method as claimed in claim 1, wherein judging, by the first base station, whether the first UE is in the proximity with the second UE or not comprises:
    configuring, by the first base station, signal measurement to be performed by the first UE over the second UE, judging whether a D2D communication link quality threshold is met or not according to a measurement report sent by the first UE, determining that the first UE is in the proximity with the second UE when the D2D communication link quality threshold is met, or determining that the first UE is not in the proximity with the second UE when the D2D communication link quality threshold is not met; or
    judging, by the first base station, whether a D2D communication link quality threshold is met or not according to a signal measurement result, obtained by the first UE, of the second UE carried in a received message, sent by the first UE, comprising first mode switching request information, determining that the first UE is in the proximity with the second UE when the D2D communication link quality threshold is met, or determining that the first UE is not in the proximity with the second UE when the D2D communication link quality threshold is not met; or
    acquiring, by the first base station, information about whether the first UE is in the proximity with the second UE or not from a network side entity, judging whether a distance between the first UE and the second UE meets a D2D communication distance threshold or not, determining that the first UE is in the proximity with the second UE when the distance meets the D2D communication distance threshold, or determining that the first UE is not in the proximity with the second UE when the distance does not meet the D2D communication distance threshold; or acquiring, by the first base station, geographical location information or distance information of the first UE and the second UE from a network side entity, judging whether a distance between the first UE and the second UE meets a D2D communication distance threshold or not, determining that the first UE is in the proximity with the second UE when the distance meets the D2D communication distance threshold, or determining that the first UE is not in the proximity with the second UE when the distance does not meet the D2D communication distance threshold;

wherein, when the first UE is in the proximity with the second UE, the first base station determines that the first UE and the second UE are qualified to perform D2D communication; or when the first UE is not in the proximity with the second UE, the first base station determines that the first UE and the second UE are able to perform cellular communication only.

6. The method as claimed in claim 5, wherein the message, comprising the first mode switching request information, comprises at least one of the followings:

an identifier of the second UE, a signal measurement result, obtained by the first UE, of the second UE, a signal measurement result, obtained by the first UE, of the first base station, an indication indicating which one of cellular communication and D2D communication is being conducted between the first UE and the second UE, bearer information corresponding to a data stream of the cellular communication or the D2D communication between the first UE and the second UE, quality of service information corresponding to data stream and/or bearer of the cellular communication or the D2D communication between the first UE and the second UE and an indication about whether data bearer of the D2D communication has been established between the first UE and the second UE or not and/or data bearer of the D2D communication is required to be established between the first UE and the second UE.

7. The method as claimed in claim 1, wherein the network side entity comprises one of the followings: a packet data gateway serving the UE, a Serving GateWay, SGW, an MME, a ProSe function, a location information server and an entity with a UE discovery and detection function;

or by the first base station, whether there are enough D2D communication air interface resources for the D2D communication between the first UE and the second UE or not comprises:

judging, by the first base station, whether there are enough D2D communication resources supporting corresponding D2D communication or not according to bearer information corresponding to data stream of the cellular communication between the first UE and the second UE and quality of service information corresponding to data stream and/or bearer of the cellular communication between the first UE and the second UE; and when a judgment result indicates that there are enough D2D air interface resources supporting the data stream of the cellular communication between the first UE and the second UE, determining, by the first base station, that there are enough D2D communication air interface resources for the D2D communication between the first UE and the second UE;

or judging, by the first base station, whether there are enough cellular communication air interface and backbone link resources or not comprises:

judging, by the first base station, whether there are enough cellular communication air interface and backbone link resources supporting corresponding cellular communication or not according to bearer information corresponding to data stream of the D2D communication between the first UE and the second UE and quality of service information corresponding to the data stream and/or bearer of the D2D communication between the first UE and the second UE;

wherein, when there are enough cellular communication air interface and backbone link resources supporting the data stream and/or bearer of the D2D communication between the first UE and the second UE, the first base station determines that there are enough cellular communication air interface and backbone link resources for the cellular communication between the first UE and the second UE.

8. The method as claimed in claim 1, wherein triggering, by the first base station, the first UE to perform the mode switching comprises:

determining, by the first base station, a second base station, and judging, by the second base station, whether a second UE meets a condition of the mode switching or not, wherein, when the first base station is different from the second base station, the first base station initiates mode switching negotiation with the second base station to confirm whether the second UE meets the condition of the mode switching or not; and when the second base station determines that the second UE meets the condition of the mode switching, the first base station and the second base station send messages comprising the mode switching information to require the first UE and the second UE to execute the mode switching.

9. The method as claimed in claim 8, wherein initiating, by the first base station, the mode switching negotiation with the second base station comprises:

sending, by the first base station, a message comprising mode switching negotiation request information to the second base station;

receiving, by the second base station, the message comprising the mode switching negotiation request information, and judging whether the second UE meets the condition of the mode switching or not;

when the second UE meets the condition of the mode switching, sending, by the second base station, a message comprising mode switching negotiation request confirmation information to the first base station, or when the second UE does not meet the condition of the mode switching, sending, by the second base station, a message comprising mode switching negotiation failure information to the first base station, the mode switching negotiation failure information containing a failure reason indication; and when the first base station receives the message comprising the mode switching negotiation request confirmation information, determining that the mode switching negotiation succeeds;

or, after sending the message comprising the mode switching negotiation request information to the second base station, sending, by the first base station, a message comprising mode switching negotiation cancellation information to the second base station to cancel the mode switching negotiation which is being performed.

10. The method as claimed in claim 9, wherein
the message comprising the mode switching negotiation request information carries at least one of the followings: an identifier of the first UE, an identifier of the second UE, the bearer information corresponding to the cellular communication/D2D communication data stream supported by the first base station between the first UE and the second UE, the quality of service information corresponding to the cellular communication/D2D communication data stream and/or bearer supported by the first base station between the first UE and the second UE, the indication about whether the corresponding D2D communication/cellular communication bearer has been established between the first UE and the second UE or not and/or an indication indicating that D2D communication/cellular communication bearer is required to be established between the first UE and the second UE, a D2D communication resource mode configured for the first UE by the first base station, and D2D capability information of the first UE; and
the message comprising the mode switching negotiation request information explicitly comprises one or more mode switching types.

11. The method as claimed in claim 1, wherein before judging, by the first base station, the MME or the ProSe function, whether the first UE meets the condition of the mode switching or not, the method further comprises:
when the mode switching refers to switching from the cellular communication mode to the D2D communication mode, acquiring, by the first base station, the MME or the ProSe function, mode tendency information, which indicates that the D2D communication mode is preferably adopted, of the first UE; and/or one of conditions as follows:
the first base station, the MME or the ProSe function receives the message comprising a second mode switching request information from the first UE, and a packet data gateway, an SGW and/or the first base station perform(s) network burden reduction;
when the mode switching refers to switching from the D2D communication mode to the cellular communication mode, acquiring, by the first base station or the MME or the ProSe function, mode tendency information, which indicates that the cellular communication mode is preferably adopted, of the first UE; and/or,
receiving, by the first base station or the MME or the ProSe function, the message comprising a second mode switching request information from the first UE.

12. The method as claimed in claim 11, wherein the mode tendency information comprises one of the followings: preference to the D2D communication mode, preference to the cellular communication information, no preference;
or a range of the mode tendency information comprises at least one of: a UE level, an application level, a data stream level and a bearer level;
or the mode tendency information is stored in a Home Subscriber Server, HSS, or the ProSe function as subscription information of a UE, and the mode tendency information is configured and modified through the corresponding UE;

or the second mode switching request information is directly sent through dedicated signalling or indirectly sent through a measurement report message.

13. A method for mode switching, comprising:
receiving, by a first User Equipment, UE, a message comprising mode switching information from a first base station, wherein the first base station is a serving base station of the first UE; and
performing, by the first UE, the mode switching according to indication information of a mode carried in the mode switching information;
wherein the mode switching information contains at least one of the followings: resource configuration information for D2D communication between the first UE and a second UE; D2D communication/cellular communication bearer establishment and configuration information used for establishing a D2D communication/cellular communication bearer between the first UE and a second UE; and updated Trivial File Transfer, TFT, information;
wherein the mode switching comprises: switching from a cellular communication mode to a Device-to-Device, D2D communication mode and switching from the D2D communication mode to the cellular communication mode.

14. The method as claimed in claim 13, wherein before performing, by the first UE, the mode switching according to the indication information of the mode carried in the message comprising the mode indication information, the method further comprises:
judging, by the first UE, whether a condition of switching from a cellular communication mode to a D2D communication mode is met or not according to the received mode switching information; or
judging, by the first UE, whether a condition of switching from the D2D communication mode to the cellular communication mode is met or not according to the received mode switching information.

15. The method as claimed in claim 14, wherein receiving, by the first UE, the mode switching information, and judging whether the condition of switching from the cellular communication mode to the D2D communication mode is met or not comprises:
judging, by the first UE, whether the first UE supports a D2D communication function and/or passes D2D communication authorization and authentication or not; and
judging, by the first UE, whether there are enough D2D communication resources for the D2D communication between the first UE and a second UE or not;
or the mode switching information comprises:
a mode switching indication, a UE identifier, D2D communication data stream and/or bearer information for performing the mode switching and cellular communication data stream and/or bearer information for performing the mode switching.

16. The method as claimed in claim 13, wherein performing, by the first UE, the mode switching according to the indication information in the mode switching information comprises:
judging, by the first UE, whether to establish data bearer of cellular communication or data bearer of D2D communication or not, or judging according to the switched D2D communication/cellular communication indicated by the mode switching information, by the first UE, whether to modify data bearer of the cellular communication data bearer/D2D communication or not;

in the case that the first UE has not yet established the cellular communication/D2D communication data bearer, establishing, by the first UE, the communication data bearer corresponding to the indication information of the mode switching information;

in the case that the first UE has established the cellular communication data bearer/D2D communication data bearer and the first UE has acquired updated TFT information, switching, by the first UE, D2D communication data stream and/or data bearer or cellular communication data stream and/or data bearer indicated by the mode switching information to the bearer corresponding to the indication information of the mode switching information for communication; and in the case that the first UE is required to modify data bearer of cellular communication/D2D communication, initiating, by the first UE, an operation of modifying data bearer, wherein the cellular communication data bearer or D2D communication data bearer comprises configuration information corresponding to Packet Data Convergence Protocol, PDCP, Radio Link Control, RLC, and Media Access Control, MAC, entities and logic channels.

17. The method as claimed in claim 16, wherein the method further comprises: sending, by the first UE, a message comprising mode switching completion information to the first base station; or initiating, by the first UE, to release the D2D communication/cellular communication data bearer indicated by the mode switching information.

18. The method as claimed in claim 16, wherein in the case that the first UE has yet not established the cellular communication/D2D communication data bearer, establishing, by the first UE, the communication data bearer indicated by the mode switching information comprises:

when the mode switching refers to switching from cellular communication to D2D communication, establishing, by the first UE, the D2D communication data bearer with the second UE through the first base station or directly, and updating, by the first UE, TFT information; and when the mode switching refers to switching from the D2D communication to the cellular communication, when the cellular communication data bearer between the first UE and the second UE has not been established, requesting, by the first UE, to establish the cellular communication data bearer, and updating, by the first UE, the TFT information.

19. The method as claimed in claim 16, wherein switching, by the first UE, the data stream and/or data bearer of the D2D communication or the data stream and/or data bearer of the cellular communication indicated by the mode switching information to the bearer corresponding to the indication information of the mode switching information for communication comprises:

when the mode switching refers to switching from cellular communication to D2D communication, implementing, by the first UE, through the D2D communication data bearer the D2D communication for the data stream, indicated by the mode switching information, of the first UE and the second UE by virtue of D2D communication resources of the first base station, which are scheduled by the first base station or for which are competed by the first UE; and when the mode switching refers to switching from the D2D communication to the cellular communication, implementing, by the first UE, through the cellular communication data bearer the cellular communication for the data stream indicated by the mode switching information, of the first UE and the second UE by virtue of cellular communication resources, which are scheduled by the first base station.

20. A device for mode switching, which is applied to a first base station, comprising:

a sending component, configured to send a message comprising mode switching information to a first User Equipment, UE, to trigger the first UE to perform mode switching according to indication information of a mode in the mode switching information;

wherein the first judgment component comprises:

a second judgment component, configured to, when the following conditions are met, determine that the first UE meets a condition of switching from a cellular communication mode to a D2D communication mode:

the first UE supports a D2D communication function;

cellular communication is performed between the first UE and a second UE;

the first UE is in a proximity with the second UE;

there are enough D2D communication air interface resources for D2D communication between the first UE and the second UE;

a third judgment component, configured to, when at least one of the following condition is met, determine that the first UE meets a condition of switching from the D2D communication mode to the cellular communication mode:

cellular communication is performed between the first UE and the second UE;

there are enough cellular communication air interface and backbone link resources;

the first UE is not in the proximity with the second UE;

wherein, the second UE refers to one of the followings: a UE which has established the cellular communication with the first UE, a UE which has established D2D communication with the first UE.

21. The device as claimed in claim 20, wherein the device further comprises:

a first judgment component, configured to judge whether the first UE meets a condition of the mode switching or not, wherein the first base station is a serving base station of the first UE; or the first judgment component comprises:

a second sending component, configured to send a message comprising first mode switching request information to a Mobility Management Entity, MME, or a Device-to-Device, D2D, server; and a receiving component, configured to receive a message comprising mode switching response information from an MME or a ProSe function, wherein the mode switching response information is used for indicating that the first UE meets the condition of the mode switching.

22. The device as claimed in claim 20, the device further comprises:

a first acquisition component, configured to, when the mode switching refers to switching from the cellular communication mode to the D2D communication mode before the first judgement component judges whether the first UE meets the condition of the mode switching or not, acquire mode tendency information, which indicates that the D2D communication mode is preferably adopted, of the first UE; and/or one of conditions as follows:

the first base station receives a message comprising second mode switching request information from the first UE, and a packet data gateway, a Serving Gateway, SGW, and/or the first base station perform(s) network burden reduction;

a second acquisition component, configured to, when the mode switching refers to switching from the D2D communication mode to the cellular communication mode before the first judgement component judges whether the first UE meets the condition of the mode switching or not, acquire mode tendency information, which indicates that the cellular communication mode is preferably adopted, of the first UE; and/or, receive, by the first base station, the message comprising the a second mode switching request information from the first UE.

23. The device as claimed in claim 22, wherein the mode tendency information comprises one of the followings: preference to the D2D communication mode, preference to the cellular communication information, no preference; or a range of the mode tendency information comprises at least one of the following: a UE level, an application level, a data stream level and a bearer level; or the mode tendency information is stored in a Home Subscriber Server, HSS, or a ProSe function as subscription information of a UE, and the mode tendency information is configured and modified through the corresponding UE.

24. The device as claimed in claim 20, wherein a first mode switching request information and a second mode switching request information are directly sent through dedicated signalling or sent through a measurement report message.

25. The device as claimed in claim 20, wherein a first mode switching request information and a second mode switching request information comprise at least one of the following: an identifier of the second UE, a signal measurement result, obtained by the first UE, of the second UE, a signal measurement result, obtained by the first UE, of the first base station, an indication about cellular communication or D2D communication between the first UE and the second UE, bearer information corresponding to a cellular communication or D2D communication data stream between the first UE and the second UE, quality of service information corresponding to data stream and/or bearer of the cellular communication or D2D communication between the first UE and the second UE and an indication about whether data bearer of the D2D communication is established between the first UE and the second UE or not and/or data bearer of the D2D communication is required to be established between the first UE and the second UE.

26. The device as claimed in claim 25, wherein the first mode switching request information and the second mode switching request information comprise information of a second base station, wherein the second base station is a serving base station of the second UE.

27. A mode switching device, which is applied to first User Equipment, UE, comprising:

a receiving component, configured to receive a message comprising mode switching information from a first base station, wherein the first base station is a serving base station of the first UE; and a switching component, configured to perform the mode switching according to indication information of a mode in the mode switching information;

wherein the mode switching information contains at least one of the followings:

resource configuration information for D2D communication between the first UE and a second UE; D2D communication/cellular communication bearer establishment and configuration information used for establishing a D2D communication/cellular communication bearer between the first UE and a second UE; and updated Trivial File Transfer, TFT, information;

wherein the mode switching comprises: switching from a cellular communication mode to a Device-to-Device, D2D, communication mode and switching from the D2D communication mode to the cellular communication mode.

28. The device as claimed in claim 27, wherein the device further comprises:

a fourth judgment component, configured to judge whether a condition of switching from the cellular communication mode to the D2D communication mode is met or not according to the received mode switching information; and a fifth judgment component, configured to judge whether a condition of switching from the D2D communication mode to the cellular communication mode is met or not according to the received mode switching information.

* * * * *